United States Patent [19]
Neculescu et al.

[11] Patent Number: 6,100,512
[45] Date of Patent: Aug. 8, 2000

[54] MICROWAVEABLE MICRONODULAR SURFACE INCLUDING POLYPROPYLENE, MICA AND TALC

[75] Inventors: Cristian M. Neculescu; Richard J. Rogers, both of Neenah; Mark B. Littlejohn, Appleton, all of Wis.

[73] Assignee: Fort James Corporation, Deerfield, Ill.

[21] Appl. No.: 08/917,439

[22] Filed: Aug. 19, 1997

[51] Int. Cl.[7] ..................................................... H05B 6/80
[52] U.S. Cl. ......................... 219/725; 428/35.7; 426/203
[58] Field of Search ..................................... 219/725, 730, 219/731, 734; D/14; 426/113, 203, 423; 524/128; 428/36.7, 35.7; 220/306; 264/175

[56] References Cited

U.S. PATENT DOCUMENTS

| | | | |
|---|---|---|---|
| 4,933,526 | 6/1990 | Fisher et al. | 219/730 |
| 5,023,286 | 6/1991 | Abe et al. | 524/128 |
| 5,045,369 | 9/1991 | Kobayashi et al. | 428/36.7 |
| 5,377,860 | 1/1995 | Littlejohn et al. | 220/306 |
| 5,439,628 | 8/1995 | Huang | 264/175 |

FOREIGN PATENT DOCUMENTS

| | | |
|---|---|---|
| 122686 | 10/1984 | European Pat. Off. . |
| 407198 | 1/1991 | European Pat. Off. . |
| 0544429A1 | 6/1993 | European Pat. Off. . |

OTHER PUBLICATIONS

JP 59064647 abstract, Polypropylene resin compsn., Apr. 1984.

*Primary Examiner*—Tu Ba Hoang
*Attorney, Agent, or Firm*—Finnegan, Henderson, Farabow, Garrett & Dunner

[57] ABSTRACT

Disposable food contact compatible microwaveable containers having at least one micronodular surface are disclosed. These containers including plates, bowls, cups, trays, buckets, souffle dishes, and lids are prepared from polypropylene or propylene-ethylene copolymer or blends, talc and mica mixtures and pigment and are thermoformed into the shape of the desired article of manufacture exhibiting (a) a micronodular surface on at least one side; (b) a melting point of not less than about 250° F.; these articles of manufacture being dimensionally stable and resistant to grease, sugar, and water at temperatures up to at least 250° F. and being of sufficient toughness to resist cutting by serrated polystyrene flatware.

75 Claims, 22 Drawing Sheets

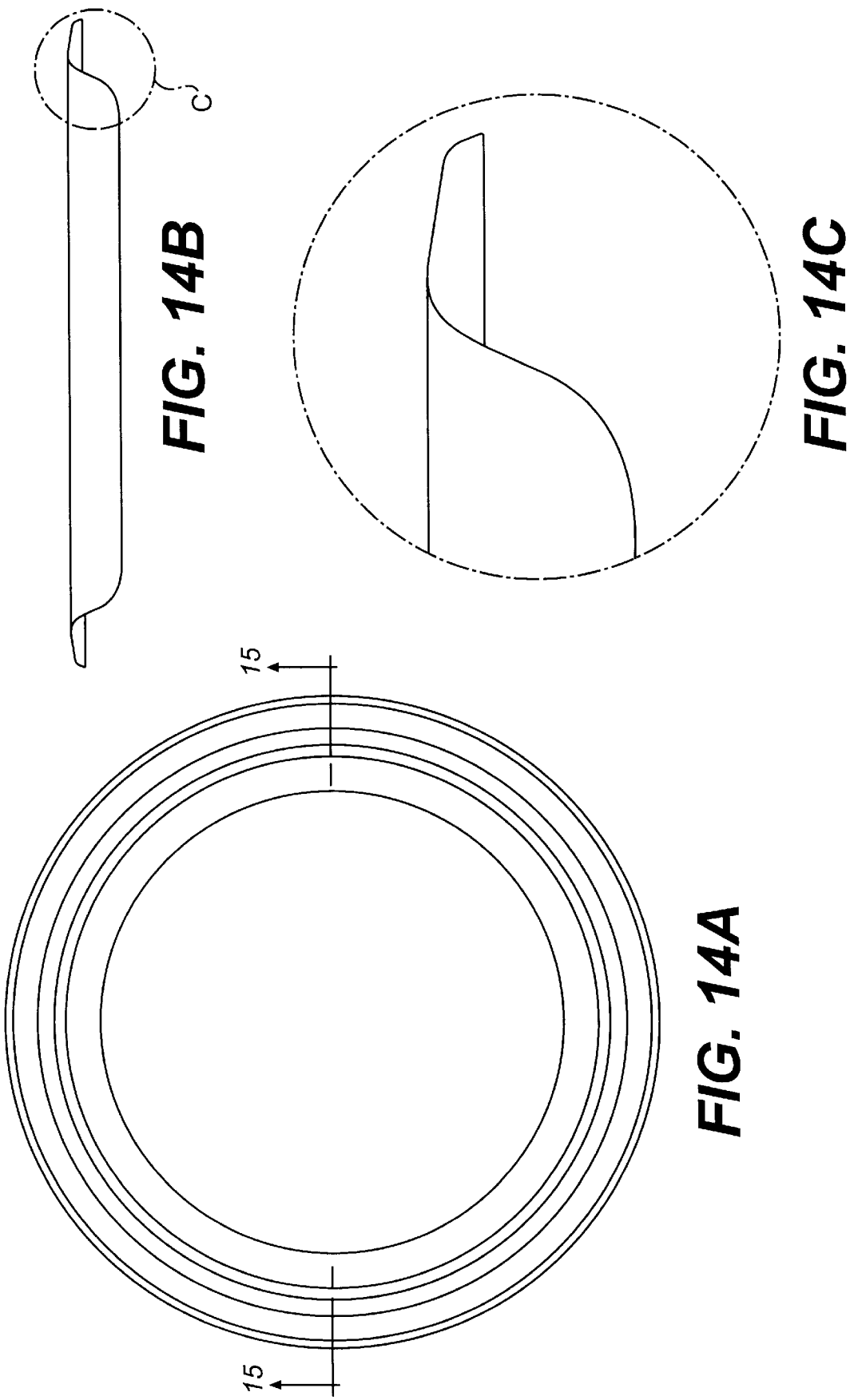

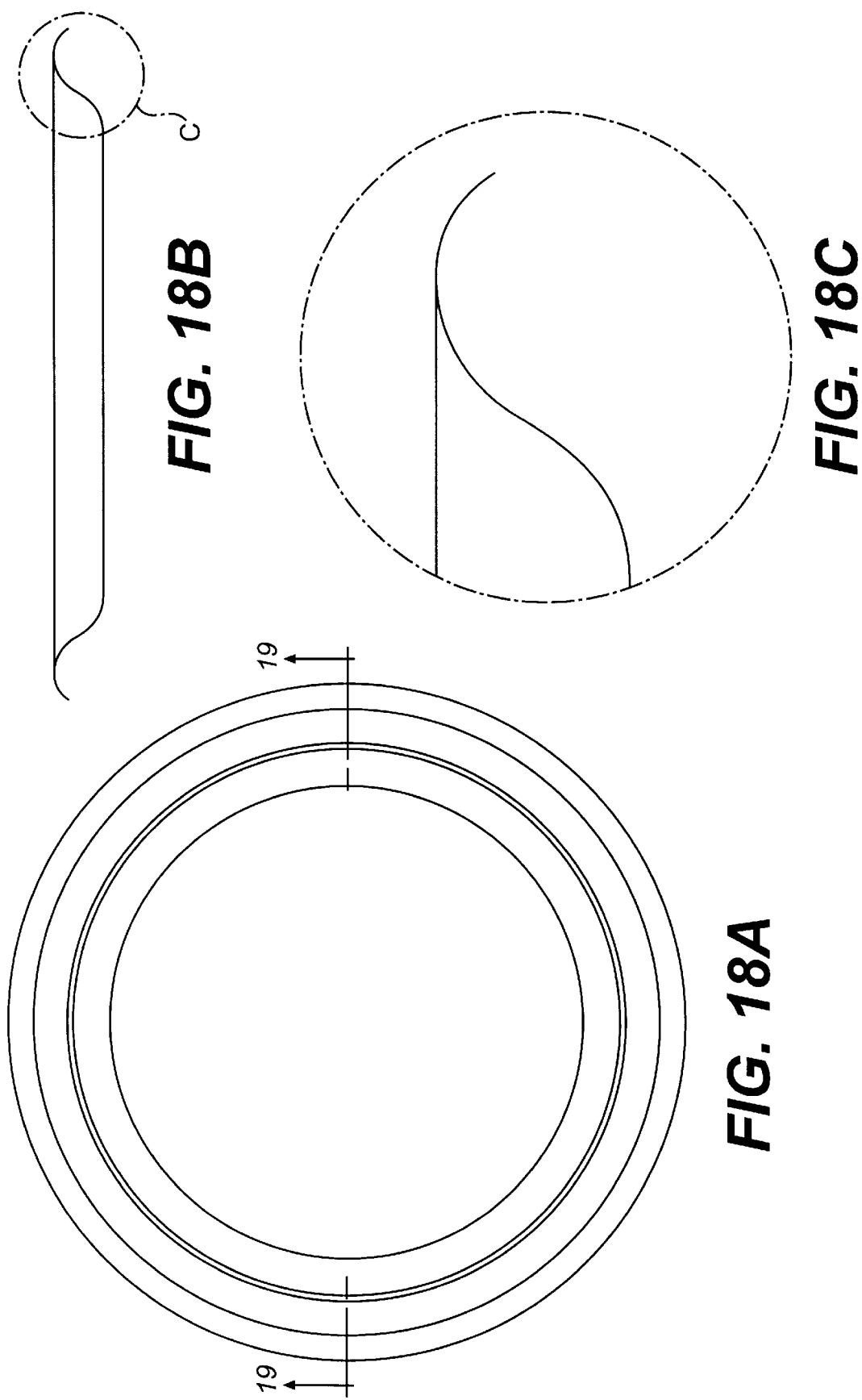

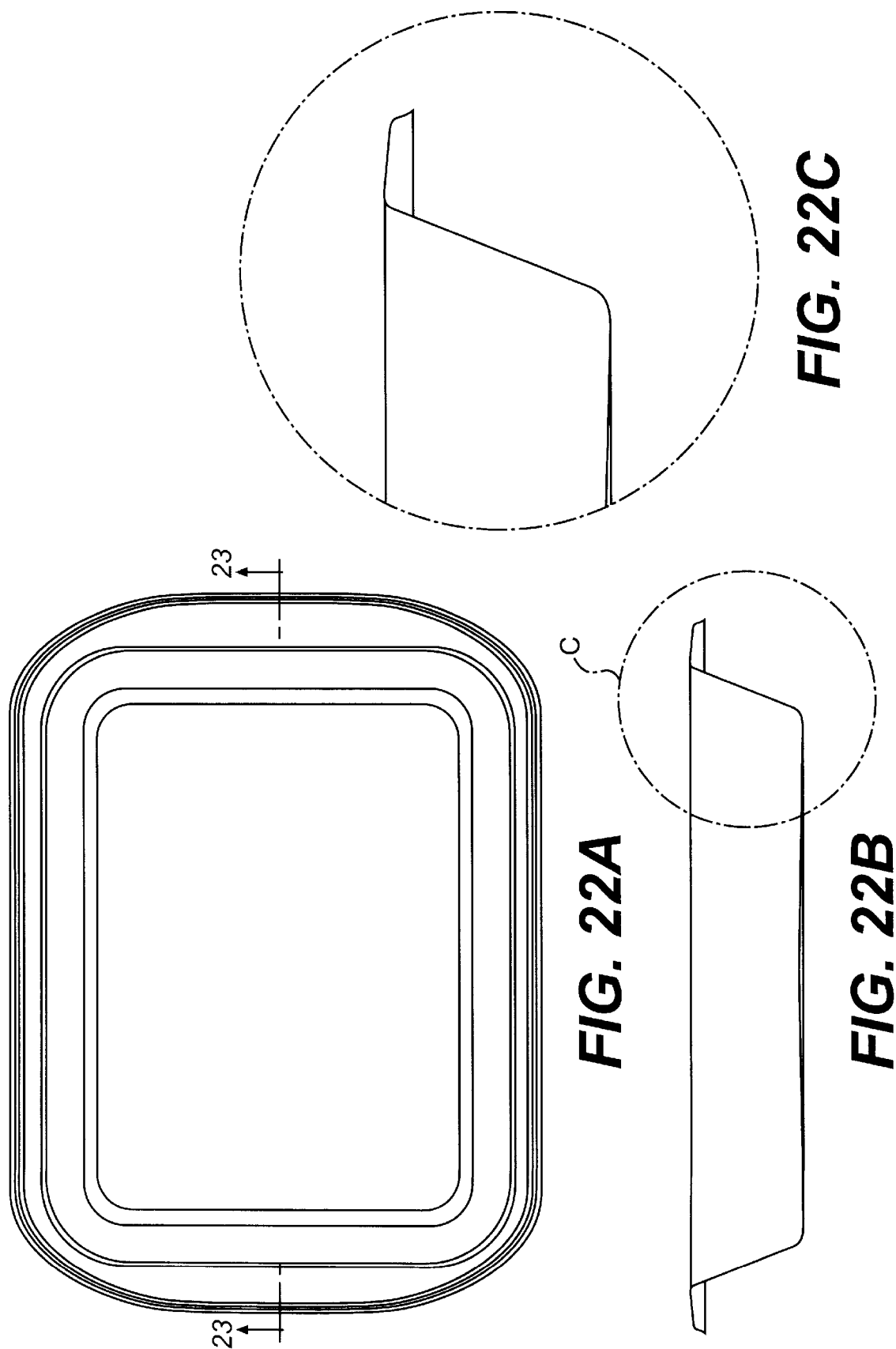

MICROWAVEABLE MICRONODULAR SURFACE INCLUDING POLYPROPYLENE, MICA AND TALC

BACKGROUND OF THE INVENTION

This invention relates to disposable plates, trays, containers, bowls, and related articles of commerce useful for the preparation, storage, delivery, and serving of food, wherein convenience and low cost are of paramount importance. Nevertheless, appearance and tactile characteristics of the plate, container, etc., are important for consumer preference. The suitability of these disposable articles of manufacture to microwave cooking, or heating of food, has an important place in today's marketplace. Both the commercial and retail market components need an aesthetically pleasing microwaveable, disposable, rigid and strong container, plate, tray, bowl and related article of manufacture. This invention is directed to economically meeting that need and provides a container, plate, tray or bowl comprising an extruded sheet of polypropylene or propylene-ethylene copolymer or blend coupled with mica and talc.

These disposable microwaveable containers including plates, bowls, cups, trays, buckets, souffle dishes, and lids exhibit (a) a micronodular surface on at least the food contact side of such container, and (b) a melting point of no less than about 250° F., said container or plate being dimensionally stable and resistant to grease, sugar, and water at temperatures up to at least 220° F. and exhibiting sufficient toughness to be resistant to cutting by serrated polystyrene flatware. Microwaveable and disposable containers and plates comprising talc and mica are not known in the prior art. In U.S. Ser. No. 08/733,463 filed on Oct. 18, 1996, and assigned to the assignee of the present patent application, now abandoned, mica filled polypropylene food contact compatible microwaveable containers are disclosed. In U.S. Pat. No. 5,377,860, assigned to assignee of the present patent application, a double shell food container is disclosed. The composition and properties of the container differ from the present invention since a polypropylene/talc/mica composition is not suggested or disclosed and the container does not have the thermal properties or the micronodular surface of the containers disclosed herein. The filled polypropylene compositions comprise about 10 to 40% by weight talc, 10 to 40% mica, wherein the total filler composition does not exceed about 40 to 50% by weight of the total polypropylene filler composition. The containers disclosed in European Patent Application D544,429A1 do not suggest or disclose a container which can meet the thermal properties and have the desirable micronodular surface of the container of the present invention.

SUMMARY OF THE INVENTION

Microwaveable, rigid, strong and food contact compatible containers and plates have been prepared. These disposable articles of manufacture exhibit (a) a micronodular surface on at least one side, usually the side coming in contact with the food; and (b) a melting point of not less than 250° F., suitably 250° F. to 330° F. These microwaveable, food contact compatible containers, trays, bowls and plates are dimensionally stable and resistant to grease, sugar, and water at temperatures of at least 220° F. and are of sufficient toughness to be resistant to cutting by serrated polystyrene flatware. These containers, in the form of disposable lunch (8.75 inch) and dinner plates (10.25 inch), exhibit a SSI rigidity of at least 470 grams per 0.5 inch at a basis weight of about 270 lbs. per 3000 square foot ream. At a basis weight of about 230, SSI rigidity is about 380 grams per 0.5 inches. The containers, bowls, trays and plates of this invention answer a long felt need for products which can withstand the severe conditions of a microwave oven when common foods such as beans and pork, pancakes with syrup, pepperoni pizza, and broccoli with cheese are microwaved during food cooking and reconstituting processes.

Competing commercial polystyrene type plates cannot withstand the high temperatures generated in the microwave during food contact and either significantly warped or deformed when the aforementioned food products were placed on them. Under the more severe microwaving conditions with high grease content foods, the prior art plates tend to deform and flow to the point where parts of the plate became adhered to the inside of the microwave oven. For disposable plates, bowls, trays and containers, appearance and feel are important attributes. The micronodular surface of the plates, bowls, trays and containers of this invention tend to give these novel products the pleasing appearance and feel of stoneware or a pottery-like look. It has been found that conveniently the stoneware or pottery-like look was controlled by adding talc to the polypropylene mica composition. A controlled stoneware appearance and feel was achieved by adding specified amounts of talc to the polypropylene mica mixtures. The amount of talc added should not exceed the 30 weight percent where the total talc and mica content of the polypropylene polymer is controlled not to exceed about 40 to 50 weight percent. Another significant property of the containers and plates of this invention is their cut resistance. These rigid articles of manufacture are of sufficient toughness to be resistant to cutting by serrated polystyrene flatware. In normal usage they are also resistant to cutting by regular metal flatware.

This invention also relates to a novel process for the manufacture of microwaveable containers having at least one micronodular surface which process comprises controlling the ratio of talc to mica filler to achieve a microwaveable container having the desired micronodular surface. The micronodularity of the surface is decreased when the ratio of talc to mica is increased. For a low micronodular surface container the weight ratio of talc to mica is about 30 to 10. For high micronodular surface containers, the weight ratio of talc to mica is about 10 to 30.

BRIEF DESCRIPTION OF THE DRAWINGS

The present invention will become more fully understood from the detailed description given herein below and the accompanying drawings, which are given by way of illustration only, and thus, are not limitative of the present invention and wherein:

FIG. 3a is a scanning electron photomicrograph of the plate surface comprising polypropylene and 40% talc.

FIG. 3b is a scanning electron photomicrograph of the plate surface comprising polypropylene, 10% mica and 30% talc.

FIG. 4a is a scanning electron photomicrograph of the plate surface comprising polypropylene, 20% mica and 20% talc.

FIG. 4b is a scanning electron photomicrograph of the plate surface comprising polypropylene, 30% mica and 10% talc.

FIGS. 14A–14C are a cross sectional view of the plate of FIGS. 13A–13B.

FIGS. 18A and 18C are a cross sectional view of the plate of FIGS. 17A–17B.

FIGS. 22A–22C are a cross section or view of a tray of FIGS. 21A–21B.

DETAILED DESCRIPTION OF THE INVENTION

The aesthetically pleasing microwaveable disposable, rigid and strong containers including plates, bowls, cups, trays, buckets, souffle dishes and lids comprise isotactic polypropylene, propylene-ethylene copolymer, or blends of isotactic polypropylene and propylene-ethylene copolymer coupled with a mixture of a platy inorganic mineral such as mica and talc. Suitably coupling agents and pigments are utilized. To form suitable containers, bowls, trays and plates having excellent thermal, mechanical, and other physical properties and also exhibiting a micronodular surface, coupling agents should be utilized in conjunction with a mixture of mica and talc. The function of the coupling agent is to promote the adherence of the polypropylene moiety to the talc/mica mineral mixtures. In the absence of a coupling agent, the inorganic mineral mixture may not adhere well to the polymer matrix and so may not be integrated into the sheet from which the containers, bowls, trays and plates are thermoformed. Maleic anhydride and acrylic modified polypropylenes are suitable coupling agents.

Figure 1:
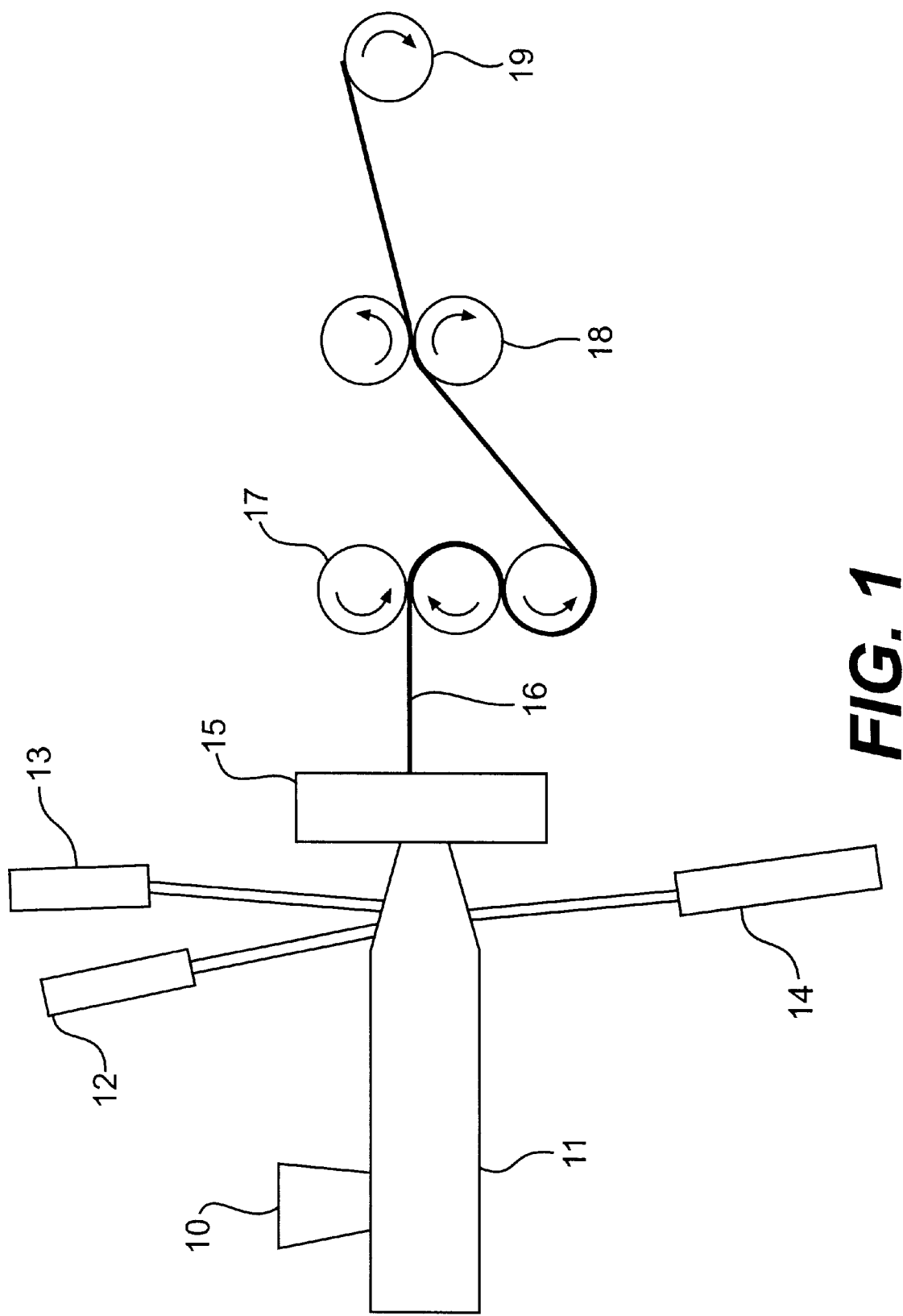
FIG. 1 is a schematic flow diagram of the sheet extrusion process.
Figure 2:
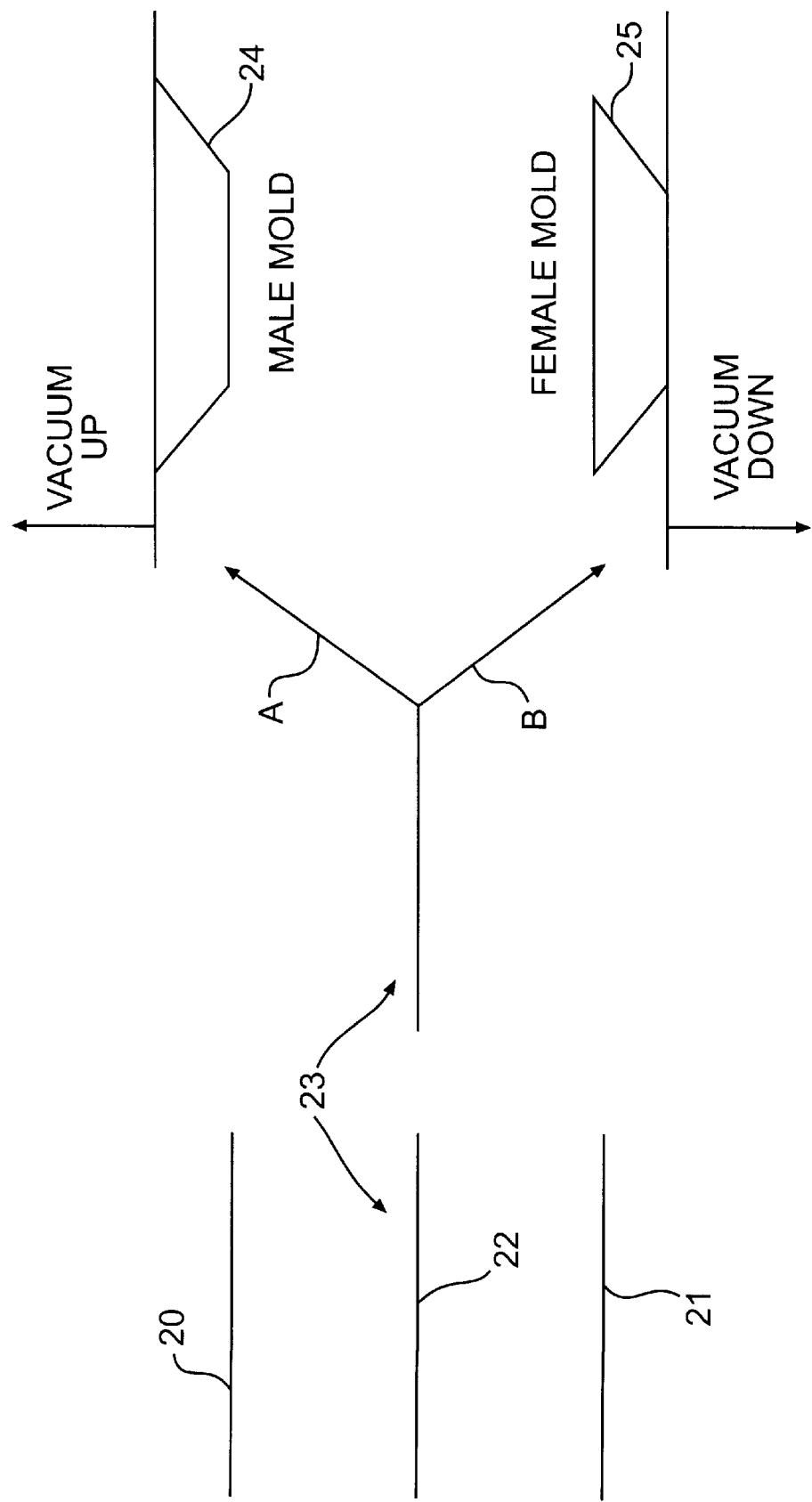
FIG. 2 is a schematic flow diagram of the thermoforming process for the manufacture of plates and containers having the micronodular surface.

The containers, bowls, trays and plates of this invention are preferably formed from a sheet which has been extruded as shown in FIG. 1 and then thermoformed as shown in FIG. 2.

Advantageously, the sheet is formed by an extrusion process utilizing the compounded polymer/filler mixtures. The final extrusion process renders a sheet with excellent thermal properties and cut resistance. Generally, injection molding is inherently not suitable for the manufacture of self-texturized micronodular containers, bowls, trays and plates since injection molded products are smooth plastic like articles which do not exhibit a micronodular surface or have a feel of stoneware or pottery-like look.

The aesthetically pleasing disposable microwaveable containers, trays, bowls and plates exhibit (a) at least one micronodular surface, this surface is usually on the food contact side of the plate or container, and (b) a melting point of at least 250° F. In addition, the container or plate is dimensionally stable and resistant to grease, sugar, and water at temperatures of at least 220° F. and is of sufficient toughness to be resistant to cutting by serrated polystyrene flatware. The mica/talc filled polypropylene plates also exhibit a thickness uniformity characterized by a thickness coefficient of variation of less than about five percent.

Mica is a common name for naturally occurring inert mineral of the phyllosilicate chemical family, specifically potassium aluminosilicate whereby the aluminum ions may be partially replaced by iron and magnesium and part of the chemically bound water may be substituted by fluorine.

Mica is easily cleaved into thin, relatively regular, flexible yet strong sheets (leaf-like flakes) with thickness in the range of half a micron and aspect ratio as high as 300. Mica is much softer than other inorganic fillers (calcium carbonate, wollastonite, glass) yet only slightly harder than talc. Mica has a slippery tactile feel and low abrasiveness relative to other common inorganic fillers.

Talc is a common name for naturally occurring hydrous magnesium silicate. It is slightly softer than mica and for plastics applications the particle range is about 5 to 30 microns and the aspect ratio is below about 50.

The reinforcement effect at 40 weight percent mica and talc mixture (in PP) is equivalent to that of 30 weight percent glass fiber. But hard inorganic fibrous fillers such as glass (various lengths) and wollastonite (acicular structures) have serious drawbacks such as abrasiveness and are prone to fracture degradation during conventional melt processing. Other fibrous (organic) fillers are derived from wood and vegetable sources and are not suitable for use in the manufacture of the containers of this invention since the organic fillers tend to degrade during processing and they are also moisture sensitive.

Extenders such as calcium carbonate and clay have been traditionally used in disposable plastic foodservice articles with low cost as the primary concern, i.e., these fillers are usually selected for cost reduction rather than reinforcement. For example, calcium carbonate is a cheap, hard, and abrasive filler which delivers moderately low reinforcement (even when coupled) due to its low aspect ratio and highly irregular particle structure. In the case where microwaveability is desired for the plastic disposable foodservice article, the not so perfect solution has been the use of relatively expensive high heat polystyrene based materials (e.g., unfilled PPO and SMA engineering resins), where PPO refers to polyphenylene oxide and SMA refers to styrene-maleic anhydride copolymer.

The mica/talc filled polypropylene containers, bowls, trays and plates of this invention have overcome the disadvantages of the prior art type containers, bowls, trays and plates and are significantly superior to them.

Platy mineral filled polypropylene is compounded by pre-blending the polypropylene in pellet or flake form with mica powder and talc powder and other additives (coupling agents, color concentrates, pigments, antioxidants, lubricants, nucleating agents, antistatic agents, etc.). This mixture is conveyed into the feed section addition point of a twin screw compounding extruder. Alternatively, the components are advantageously fed separately into the same or at different points of addition, using combinations of volumetric and/or gravimetric (i.e., loss in weight type) feeders.

For white pigmentation, titanium dioxide is preferred due to combination of brightness, and opacity, as well as stability during processing and final use. Surface treatment may be optionally used to further enhance wetting, dispersion, compatibility with matrix resins whereas the titanium dioxide forms may be of the rutile or anatase type. Alternate white pigments may also consist of calcined clay or blends of calcined clay with titanium dioxide. For black pigmentation, carbon black is preferred due to a combination of desirable characteristics such as blackness, and dispersibility, the latter of which can be carefully controlled by choice of particle size and surface chemistry. Carbon black is amorphous carbon in finely divided form which is made by either the incomplete combustion of natural gas (channel black) or by reduction of liquid hydrocarbons in refractory chambers (furnace black).

The twin screw extruder provides sufficient mixing action to effectively cause the wetting and dispersion of the filler into the polymer matrix. The twin screw extruder may be of the co-rotating or counter-rotating type, where each type is equipped with different screw flight elements which are appropriate for the feed, mixing, and melt metering zones. The discharge zone normally consists of a strand die where the exiting molten material strands are quenched in a circulating water bath followed by knife cutting into pellets.

Low molecular weight additives such as waxes, fluorinated polymers, and other specialty lubricants are suitably used as process aids to reduce the melt viscosity and improve throughput. Other additives may include nucleating agents and antistatic agents. Antioxidants may be added in small amounts, generally less than one weight percent, to minimize shear and thermal degradation of the polypropylene during the extrusion and forming processes as well as to promote the chemical stability of the sheet prior to and during final article use. Suitable antioxidants are advantageously selected from the group of phenolics and phosphites and blends thereof. These are produced by Ciba-Geigy and General Electric.

Coupling agents such as silanes (azido functional or amido styryl functional), organofunctional silicone compounds, chlorinated hydrocarbons with and without silane, in situ polymerization of monomers, or modified polyolefins are often used. For certain applications, the mica/talc particle surfaces may be pretreated with the coupling agents. For the polymeric coupling agents or compatibilizers, in particular, such agents may be conveniently added directly during the formulation compounding step. Polymeric compatibilizers are preferred for ease of handling and also for the avoidance of toxic residual monomers and solvents. In particular, maleic anhydride or acrylic modified polypropylene can be used as coupling agents. They promote the adherence between the polypropylene and the mica/talc filler and serve to minimize the embrittlement effect of the filler, and also promote toughness at ambient conditions and dimensional stability at elevated temperatures for the platy mineral filled sheets and the containers made therefrom. The use of maleic anhydride modified polypropylene, whereby the maleic anhydride is in the range of 0.5–5.0 mole percent, is preferred. The use of coupling agents promotes good interfacial bonding between the platy mineral filler and the matrix resin interface resulting in good solid state mechanical properties of the containers and plates. The coupling agents also maximize the melt strength enhancing features of the platy mica/talc filler. Melt strength of the sheets is further improved when the mica/talc mixtures are used as a filler since said filler serves to provide "inter-particle connectivity" or physical crosslinking.

Figure 30:
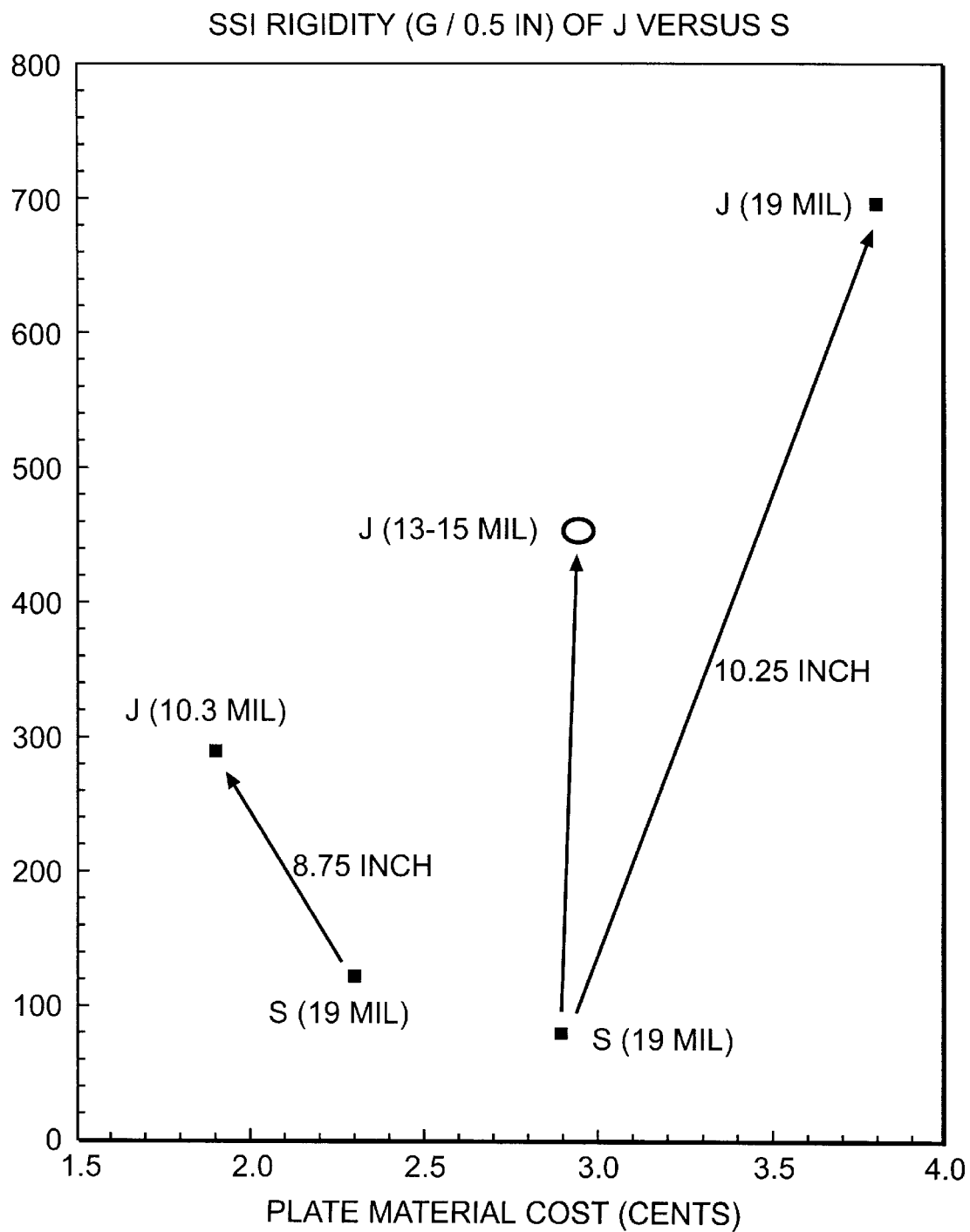
FIG. 30 is a graph comparing the rigidity of the plates of this invention with prior art commercial product in the context of current material cost.

SSI rigidity is measured with the Single Service Institute Plate Rigidity Tester originally available through Single Service Institute, 1025 Connecticut Ave. NW, Washington D.C. This test is designed to measure the rigidity (i.e. resistance to buckling and bending) of single service paper and plastic plates, bowls, dishes, and trays by measuring the force required to deflect the rim of these products a distance of 0.5 inch while the product is supported at its geometric center. Specifically, the plate specimen is held by a spring loaded clamp on one side and is center fulcrum supported. The rim or flange side opposite to the clamped side is subjected to 0.5 inch deflection by means of a motorized cam assembly equipped with a load cell, and the force (grams) is recorded. SSI rigidity is expressed as grams per 0.5 inch deflection. A higher SSI value is desirable since this indicates a more rigid product. All measurements were done at room temperature and geometric mean averages for the machine and cross machine direction are reported. As shown in FIG. 30, the containers and plates of this invention have a higher SSI rigidity than commercial plates manufactured at equal or lower cost.

Plastic cast sheet extrusion equipment is suitable for the manufacture of multilayered or single layered mica/talc filled polypropylene sheets. In FIG. 1 a process is shown for the manufacture of a single layer mica/talc filled polypropylene sheet. Previously compounded and pelletized mixtures of polypropylene, mica, talc and other additives were gravity fed by a hopper (10) into the feed zone of a single screw extruder system. Primary extruder (11) has a 2 inch diameter screw with a 24/1 length to diameter ratio. Optionally, multilayer coextruded sheet can be produced by utilizing at least one additional single screw extruder (12, 13, 14) in conjunction with a combining feedblock with proper melt piping and manifold arrangements. Suitably one to seven screw extruders are employed, preferably three. A flexible lip flat sheet die (15) having a width of 31 inches was used.

The sheet of this invention (16) entered the sheet takeoff portion (i.e., after the molten material exits the die) comprising a three-roll polishing/casing unit (17) with individually temperature controlled rolls, a two-rubber roll sheet pull unit (18), and a dual turret, dual shaft winder, whereby only one shaft winder roll (19) may be used. The three take off units were mechanically tied together, were on a common track, and can be automatically traversed from close die lip proximity to about 36 inch distant. During the extrusion process, the distance between the die exit and the casting unit were maintained at 2 inches. These three chrome rolls comprising the sheet casting unit are individually temperature controlled by integral oil circulating pumps and heat exchangers and nip gaps are adjustable. A speed differential between cast rolls and pull rolls were normally maintained such that pull roll speed were approximately within ten percent (10%) of cast roll speed. Achievable line speeds were in the range of 1–12.5 feet per minute, while for a sheet on the order of 20 mil thick, the line speed were about 5–9 feet per minute. The sheets were wound on a roll (19). Table 1 shows the sheet process conditions employed for the sheet extrusion of mica/talc filled polypropylene and the unfilled polypropylene control. These sheets suitably have a basis weight of about 200 to 950, per 3000 square foot ream preferably about 200 to 400 per 3000 square foot ream.

Thermoforming is the pressing or squeezing of pliable material into final shape. In the simplets form, thermoforming is draping of a softened sheet over a shaped mold. In the more advanced form, thermoforming is automatic, high speed positioning of a sheet having an accurately controlled temperature into a pneumatically actuated forming station whereby the article's shape is defined by the mold, followed by trimming and regrind collection.

Forming techniques other than conventional thermoforming are also suitable for the manufacture of articles described in the present invention. These include variations such as presoftening the extruded sheet to temperatures below the final melting temperature, cutting flat regions (i.e., blanks) from the sheet, transfer of blanks by gravity or mechanical means into matched molds whereby the blanks are shaped into the article by heat and pressure. The sheet from which the blanks have been cut out is collected as regrind and is recyclable. Conventional paperboard pressing equipment and corresponding forming tooling may be optionally modified to produce articles of this invention.

The extruded sheet used in the suitable forming, and thermoforming process, or the preferred thermoforming process as shown in FIG. 2 has a thickness of about 0.010 to 0.080 inches, suitably 0.010 to 0.050 inches. For plates the preferred thickness is about 0.015 to 0.025 inches. Suitable mica/talc total filler loading level in the extruded sheet is in the range of 10 to 60 weight percent, more preferably 20–50 weight percent. The suitable weight ratio of mica to talc is about 3:1 to 1:3 preferably at least about 1:1. The mica flake aspect ratio is in the range of 30–300, more preferably 15–250, with particle size range of about 10 to 500 microns. The platy talc aspect ratio is about 10 to 60 with a particle size range of about 5 to 30 microns for plastics applications. The extruded sheet comprises isotactic polypropylene homopolymer as base resin, preferably having a melt flow index in the range 0.1–5.0, more preferably about 0.2–2.0. Propylene copolymers or blends with ethylene comonomer levels in the range of 1–10 mol percent, more preferably 2–5 mol percent, are optionally used.

The preferred type of mica in the mica/talc filler mixture is muscovite, which is the most common form in commerce. Optionally other less common mica types such as phlogopite, biotite, and fluorphlogopite are used. Although there are an infinite number of compositions possible for these four generic types due to isomorphous substitution which are mine specific, the selection of particular grades is driven by particle aspect ratio, particle size, price, and availability.

The melt flow rate (MFR) or melt index is a common and simple method for determining the flow properties of molten polymers. Resin is introduced and melted in a cylindrical space. After temperature equilibration is reached, a weight is used to push a plunger vertically downward whereby the resin is extruded through a narrow orifice. The usual test temperature for polypropylene is 230° C. and the load is 2.16 Kg. Extruded material is collected and weighed and the time required to extrude a specific weight is recorded. MFR is expressed as grams per 10 minutes, which is the weight of material extruded in a 10 minute time period. MFR is inversely proportional to both polymer viscosity and polymer molecular weight.

The extruded sheet comprises coupling agents, preferably modified polypropylene, suitable modifiers are maleic anhydride or acrylic modified polypropylene. The maleic anhydride or acrylic modified polypropylene comprises about 0.5 to 3 weight percent of total sheet composition.

Suitably the extruded sheet comprises coloring agents for aesthetic appeal, preferably titanium dioxide, calcined clay, carbon black, and other opacifying and coloring agents in the range of 0.5–3.0 weight percent based on total composition. The extruded sheet comprises minor amounts of other additives such as lubricants and antioxidants.

Mica/talc filled polypropylene sheets are suitably formed into containers including plates, bowls, cups, trays, buckets, souffle dishes, and lids using a forming or thermoforming process disclosed herein. Suitably these articles and containers can be manufactured using the Comet Starlett Thermoformer Unit. This machine is capable of vacuum forming products from heat softened thermoplastic materials and is schematically depicted in FIG. 2. Sheet portions (23) having dimensions of 17.5 inches by 16.25 inches were clamped on two opposing sides and inserted into an oven (22) equipped with upper (20) and lower (21) heaters, whereby heater input settings were in the range of 20–30 percent and hold times were on the order of 60–80 seconds. Under these conditions, the oven air temperature as recorded by a digital thermocouple was in the range of 221° to 225° F., while the sheet surface temperature, as recorded by adhering indicator thermocouples, was approximately 330–340° F.

Figure 3A:
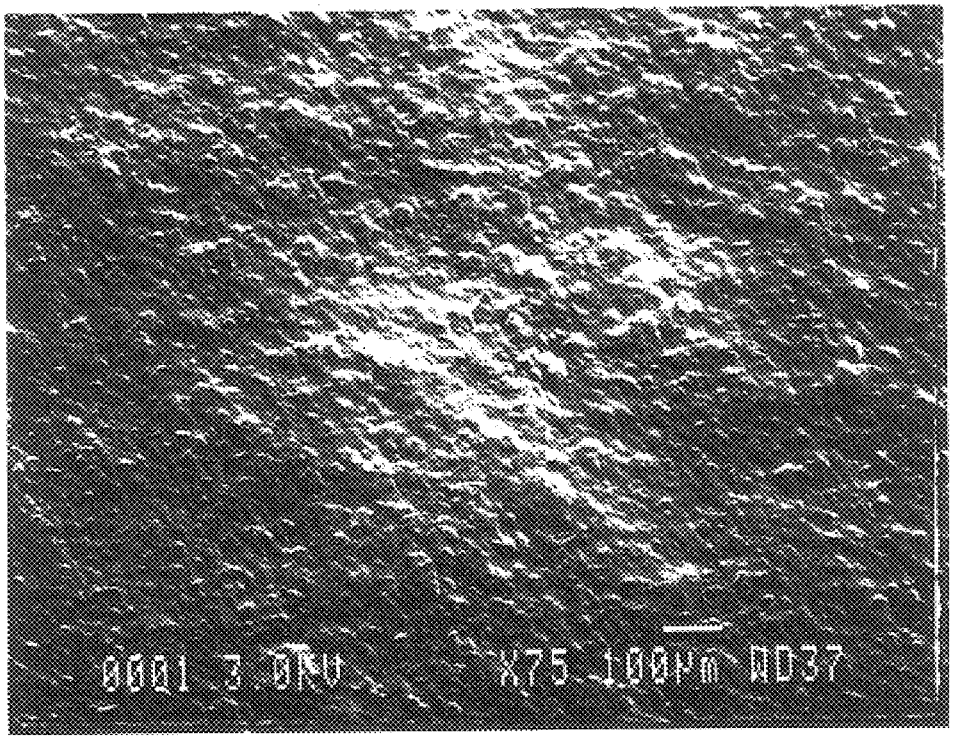
FIGS. 3a–3b contain scanning electron photomicrographs of the plate eating surface for plate surfaces having different specified mica/talc ratios.
Figure 3B:
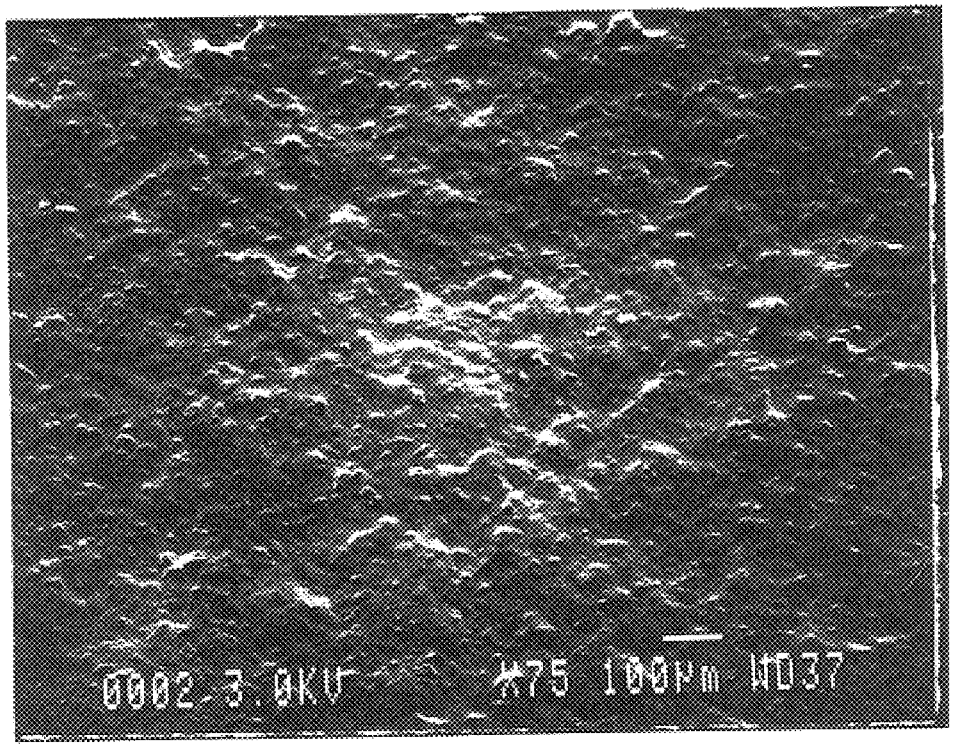
Figure 4A:
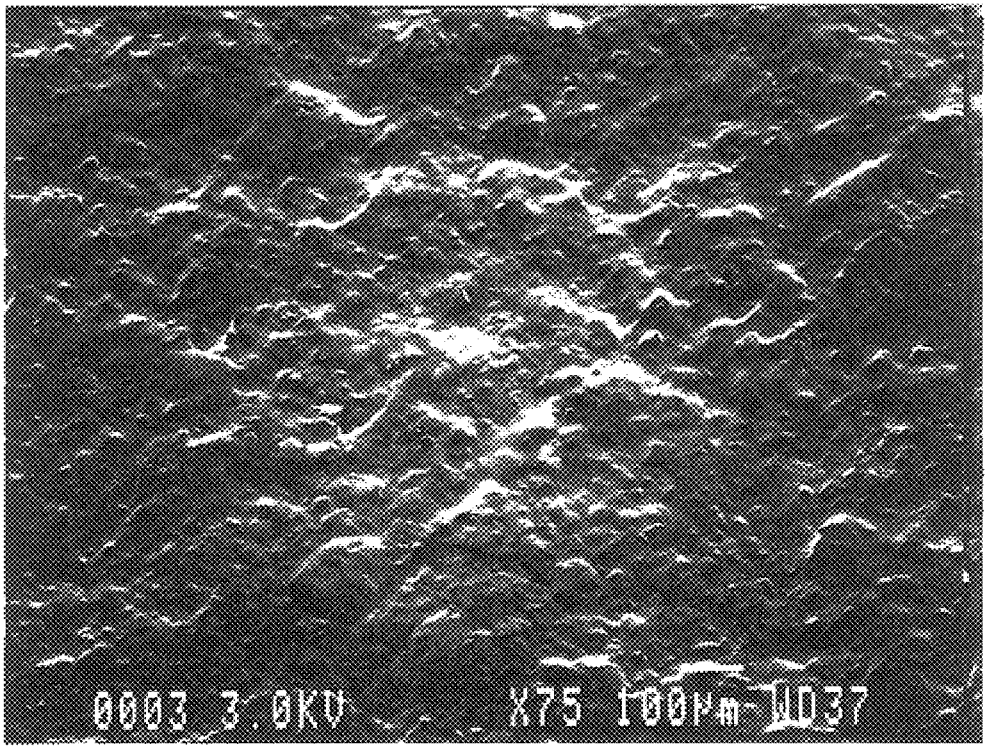
FIGS. 4a–4b contains scanning electron photomicrographs of the plate eating surface for plate surfaces having different mica/talc ratios.
Figure 4B:
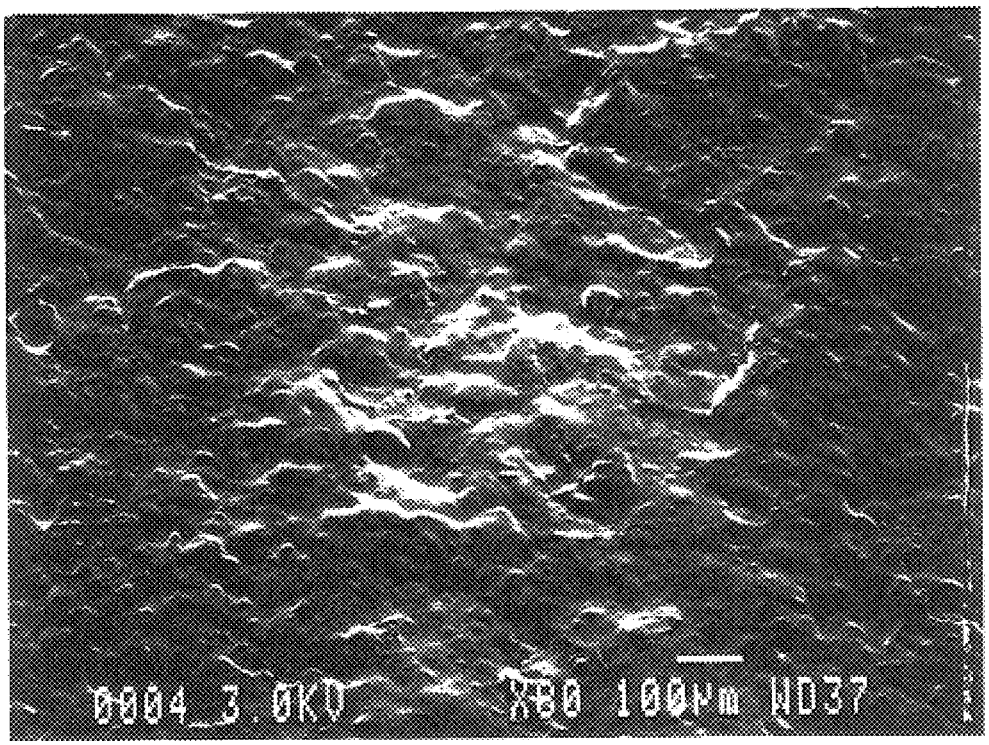
Figure 5:
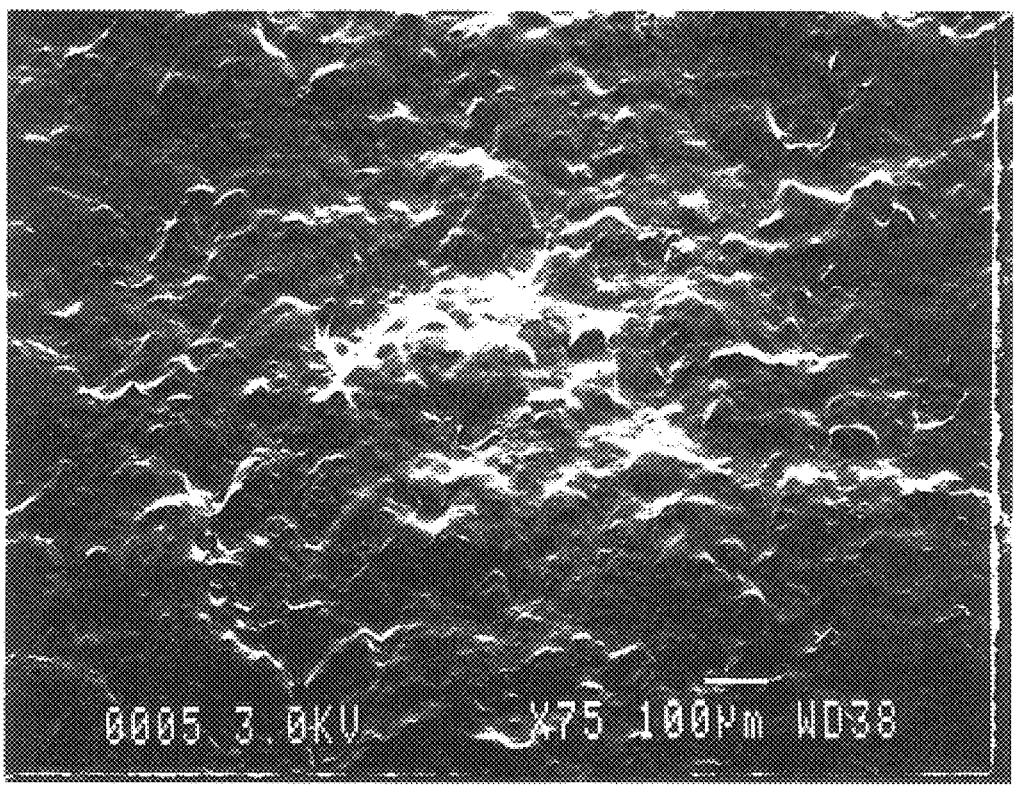
FIG. 5 is a scanning electron photomicrograph of the plate surface comprising polypropylene and 40% mica.
Figure 6:
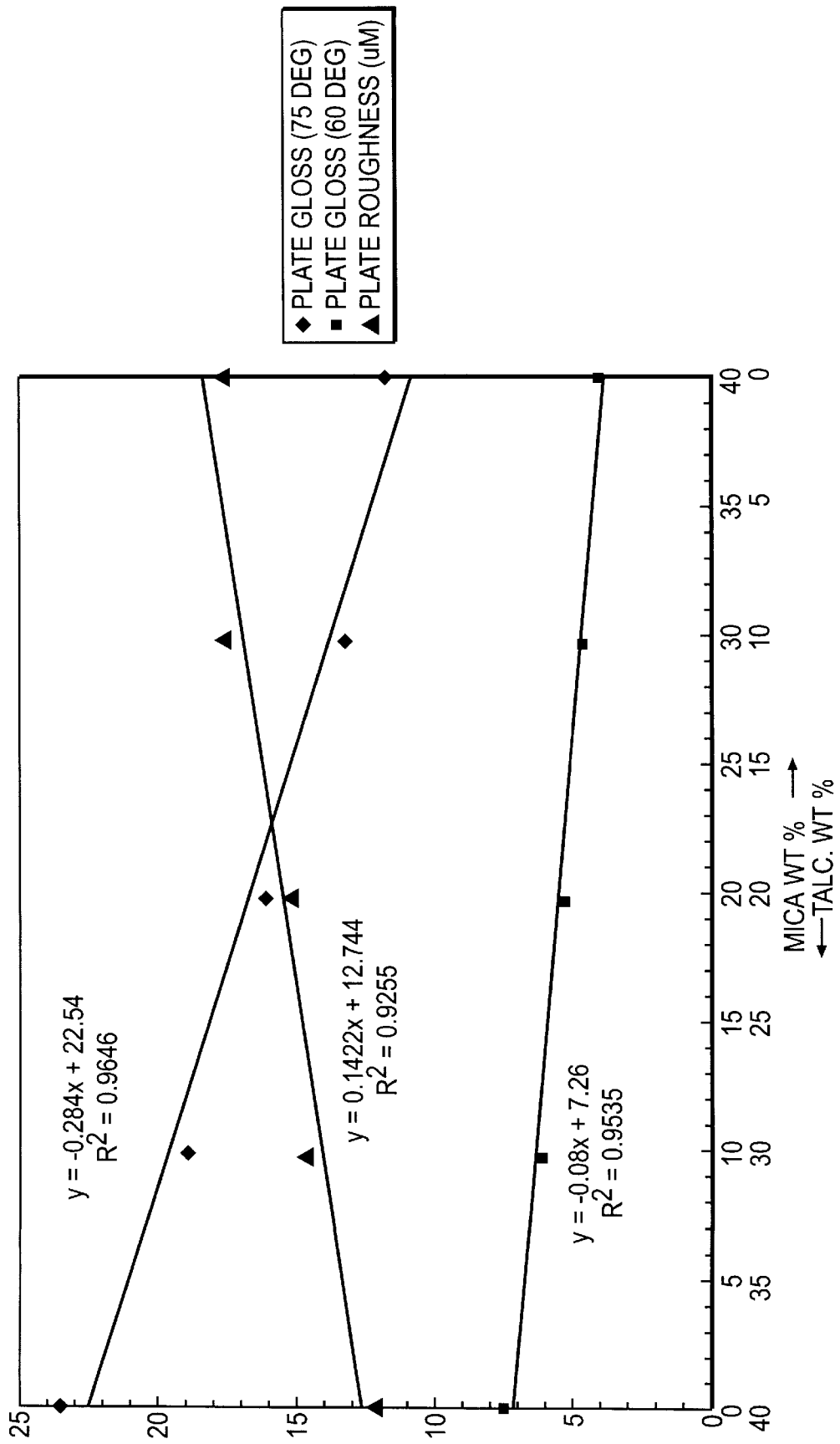
FIG. 6 is a graph comparing the plate gloss and plate roughness with various talc and mica combinations.

When the clamped and heat softened sheet (23) exits the oven (22), it may be vacuum formed by either procedure (A) or (B), both of which utilize only one mold which is suitably fabricated from epoxy thermoset materials, or suitable molding materials including aluminum, steel, beryllium copper, etc. Mode (A) uses a male mold (24) whereby the sheet is sucked up to conform to it by means of vacuum where the vacuum ports are present on the mold base as well as on the periphery side of the container (i.e., flange area). Mode (B) arrangement is such that the vacuum direction is opposite to mode (A), where again vacuum holes are located around the base and periphery. In the case of mode (B), a female mold (25) is used, and this arrangement is preferred since the air side of the sheet corresponds to the food contact side. The food contact side undergoes a beneficial texturizing effect as a result of the heat treatment, whereby the resin flows around and outward from the mica particles close to the surface causing the mineral to become more exposed which creates a micronodular surface as manifested by decreased gloss and increased surface roughness. The micronodular surface gives the container a stoneware or pottery-like appearance. This feature can be reasonably seen by reviewing FIGS. 3 through 5 where the micronodular structure of the plate is clearly shown in the black and white scanning electron photomicrograph. The photomicrograph was obtained from a 10×15 mm piece cut out of the plate bottom. The sample was mounted with surface of interest up on a specimen stub, and coated with gold/palladium. The stub was placed in a JEOL 840A Scanning Electron Microscope (SEM). Photomicrographs of the samples were taken at 75× magnification, 30 degree tilt, 39 mm working distance at 3 kv. These photographs demonstrate that by controlling the talc/mica ratio the micronodularity of the surface can be "dialed in" as required for specific product requirements.

Advantageously, other thermoforming arrangements are suitable and may be preferred in conventional sheet and web feed thermoforming commercial production operations. Alternative arrangements include the use of drape, vacuum, pressure, free blowing, matched die, billow drape, vacuum snap-back, billow vacuum, plug assist vacuum, plug assist pressure, pressure reverse draw with plug assist vacuum, reverse draw with plug assist, pressure bubble immersion, trapped sheet, slip, diaphragm, twin-sheet cut sheet, twin-sheet rollfed forming or any suitable combinations of the above. Details are provided in J. L. Throne's book, *Thermoforming*, published in 1987 by Coulthard. Pages 21 through 29 of that book are incorporated herein by reference. Suitable alternate arrangements also include a pillow forming technique which creates a positive air pressure between two heat softened sheets to inflate them against a clamped male/female mold system to produce a hollow product. Metal molds are etched with patterns ranging from fine to coarse in order to simulate a natural or grain like texturized look. Suitably formed articles are trimmed in line with a cutting die and regrind is optionally reused since the material is thermoplastic in nature. Other arrangements for productivity enhancements include the simultaneous forming of multiple articles with multiple dies in order to maximize throughput and minimize scrap.

The sheet of the present invention is suitably formed into articles of manufacture, containers, plates, or bowls having a circular configuration. These articles of manufacture may also be square or rectangular in shape having angular corners, such as found in a tray. Further, additional shapes such as triangular, multi-sided, polyhexal, etc., are contemplated, including compartmented trays and plates as well as oval platters. Suitable containers are depicted in FIGS. 13 through 29.

The description of FIGS. 13 through 29 is illustrative of the present invention, but it should be understood that these figures are not intended to limit the invention and that various changes may be made by those skilled in the art without changing the essential characteristics and basic concept of the invention. In one embodiment of this invention the plates have either the DIXIE® Superstrong profile as illustrated in FIGS. 13 through 16 and also described in U.S. Pat. No. 5,326,020 assigned to the assignee of the present invention and incorporated herein by reference into this application. These containers also may have other features such as ridges, emboss, and deboss patterns suitable for enhancing the properties of the containers of this invention.

Figure 15:
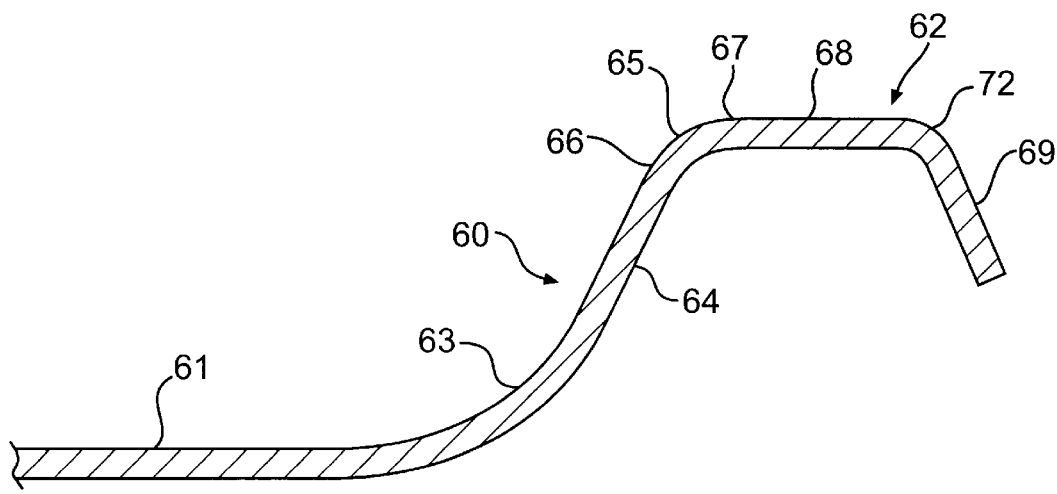
FIG. 15 is a radial cross section of the plate of FIG. 13.
Figure 16:
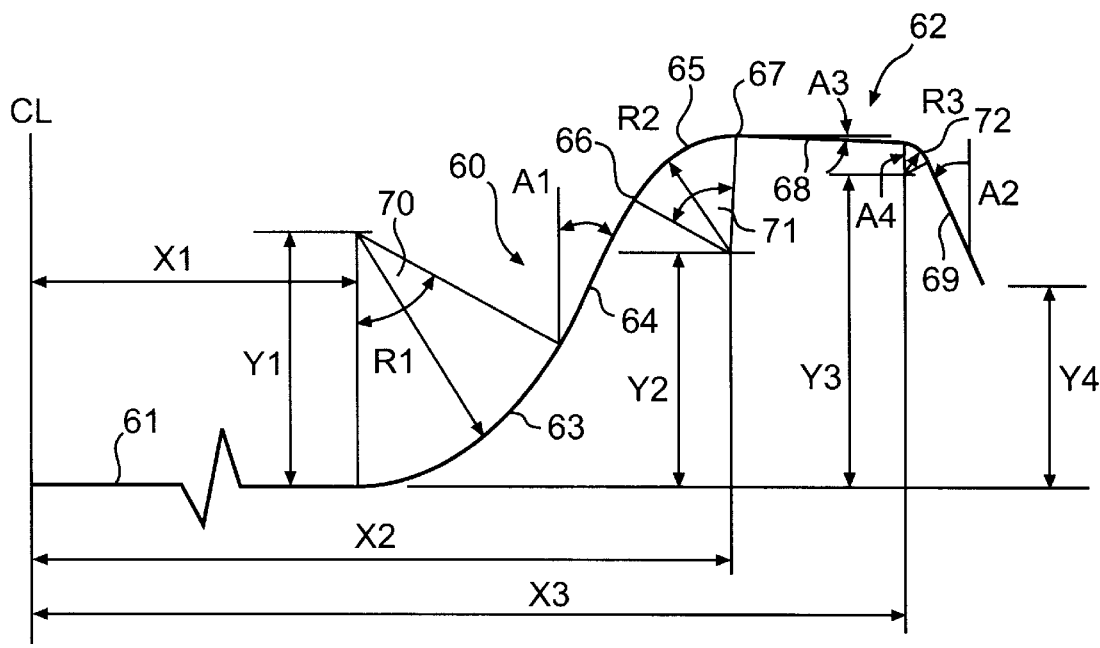
FIG. 16 is a schematic profile of the plate shown in FIG. 13 beginning from the center line of the plate.
Figure 17B:
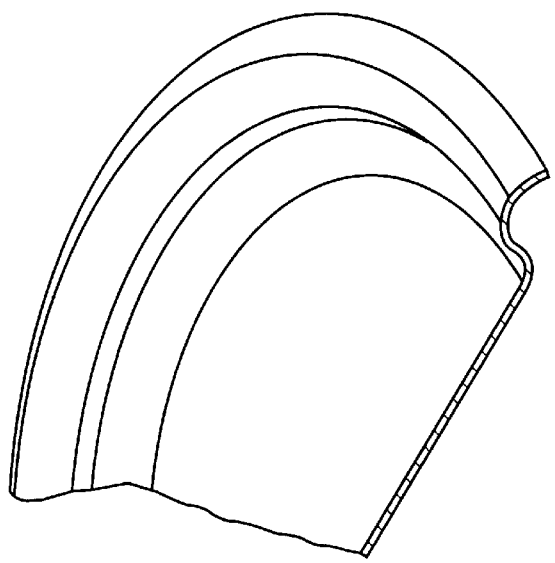
FIGS. 17A and 17B are a drawing of a plate included in this invention.
Figure 17A:
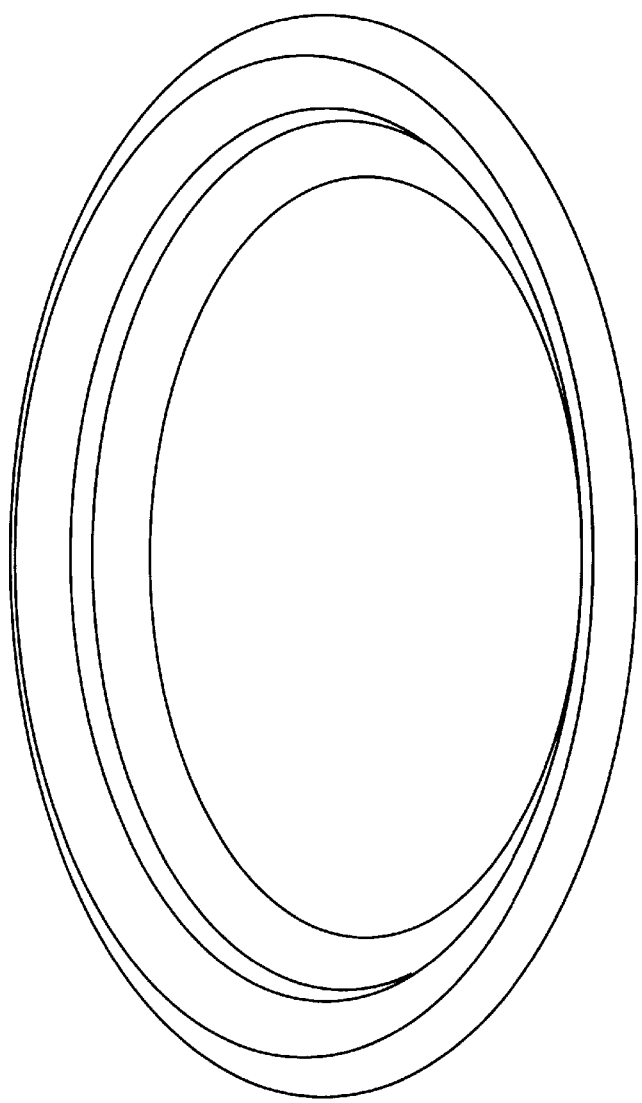
Figure 19:
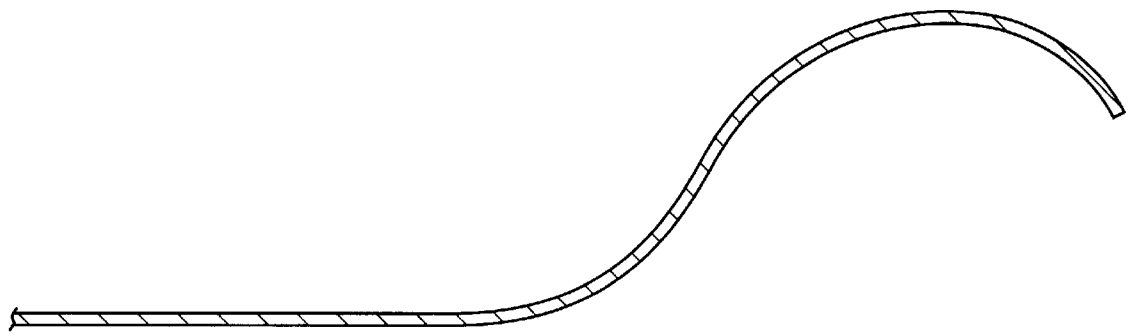
FIG. 19 is a radial cross section of a plate of FIG. 17.
Figure 20:
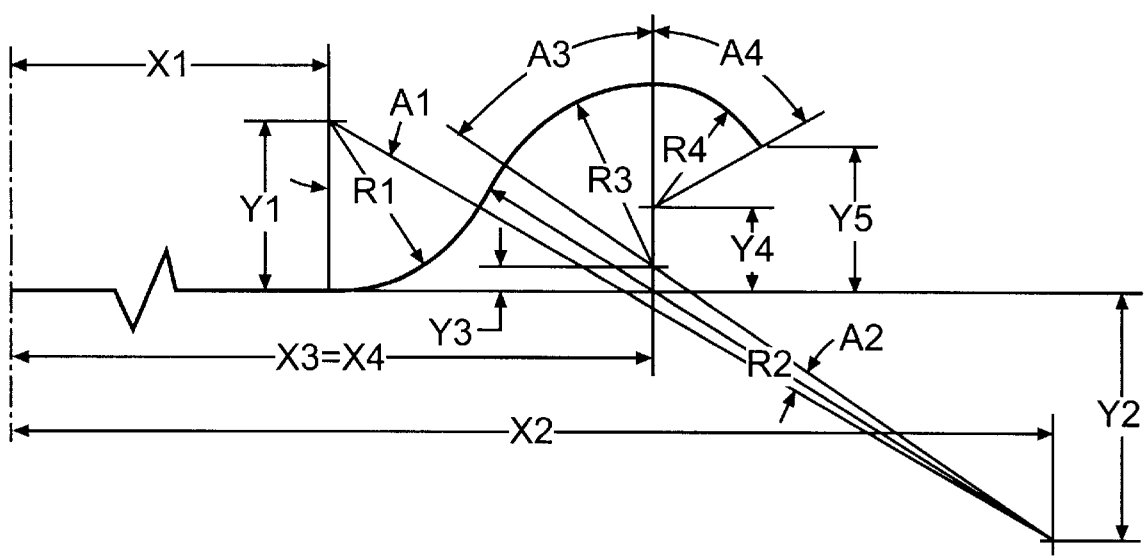
FIG. 20 is a schematic profile of the plate shown in FIG. 17 beginning from the center line.
Figure 21B:
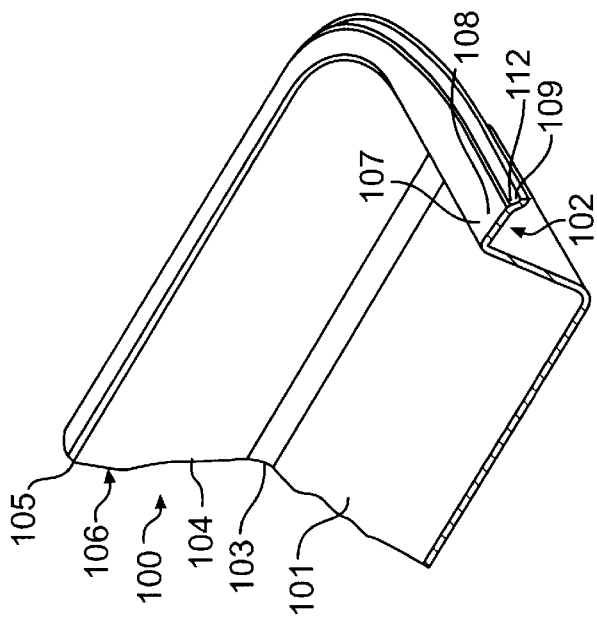
FIGS. 21A and 21B are a drawing of a tray included in this invention.
Figure 21A:
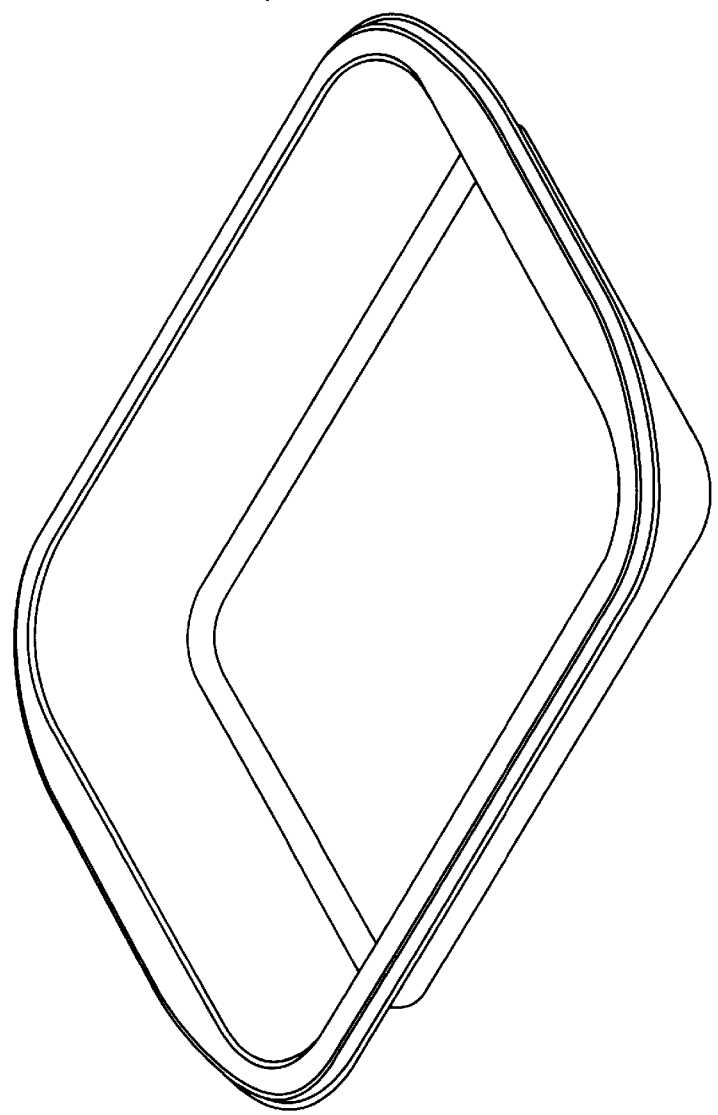
Figure 23:
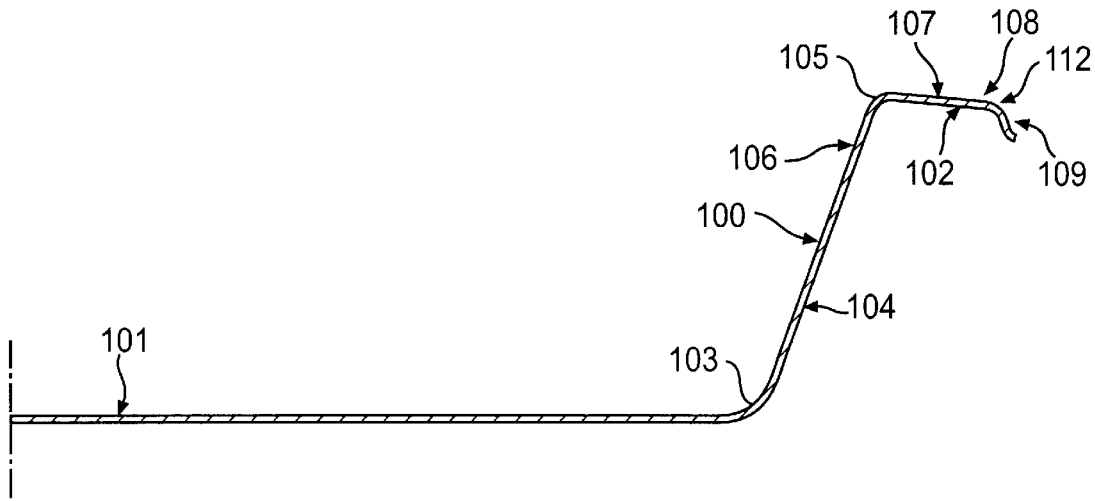
FIG. 23 is a radial cross section of a tray of FIG. 21.
Figure 24:
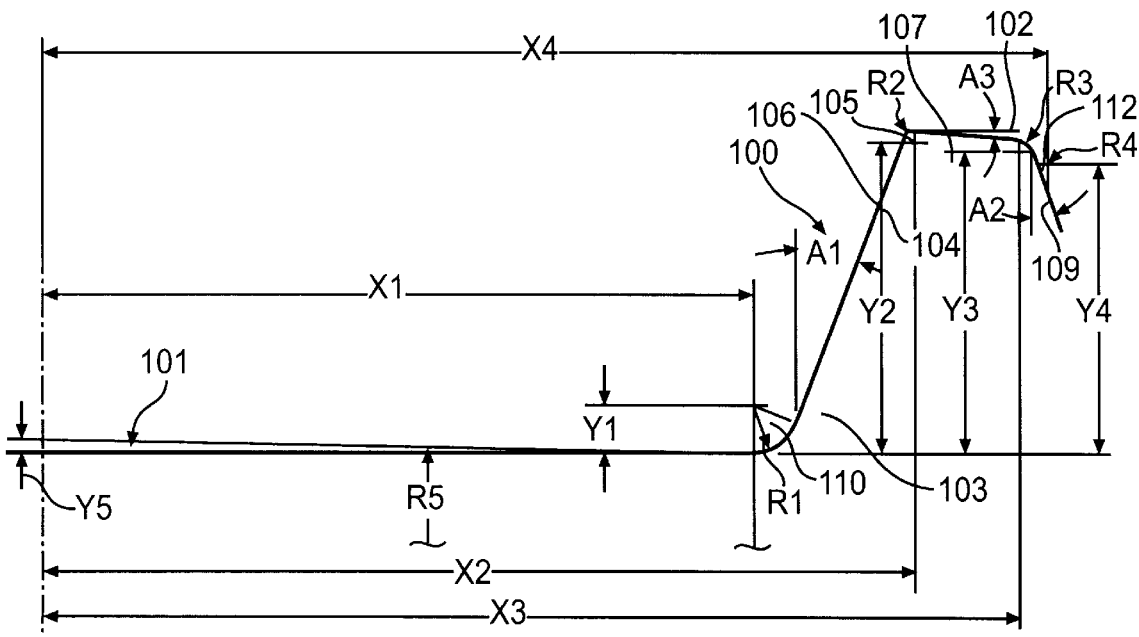
FIG. 24 is a schematic profile of the tray shown in FIG. 21 beginning from the center line.
Figure 25B:
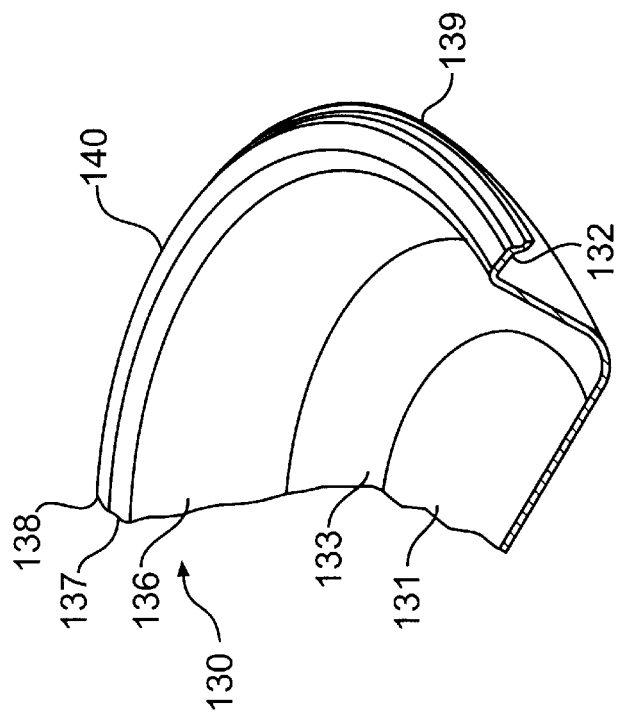
FIGS. 25A and 25B are a drawing of a bowl included in this invention.
Figure 25A:
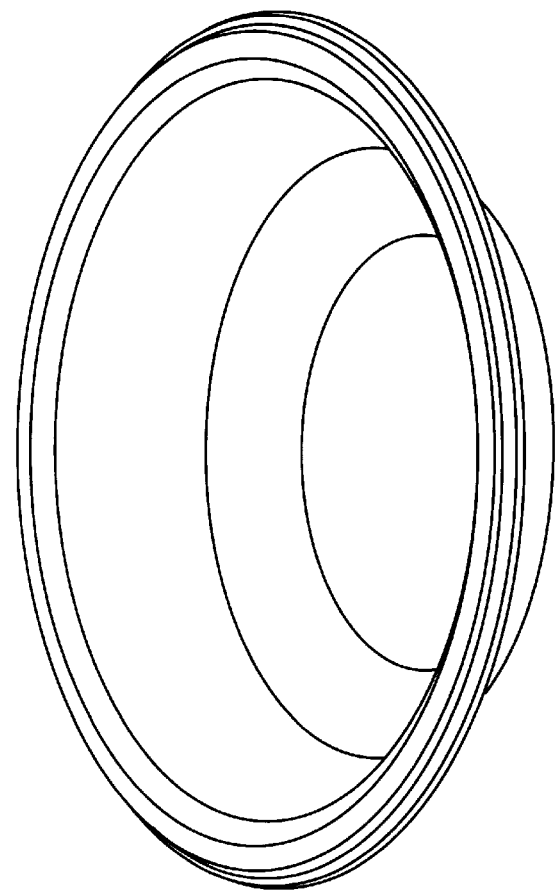
Figure 26B:
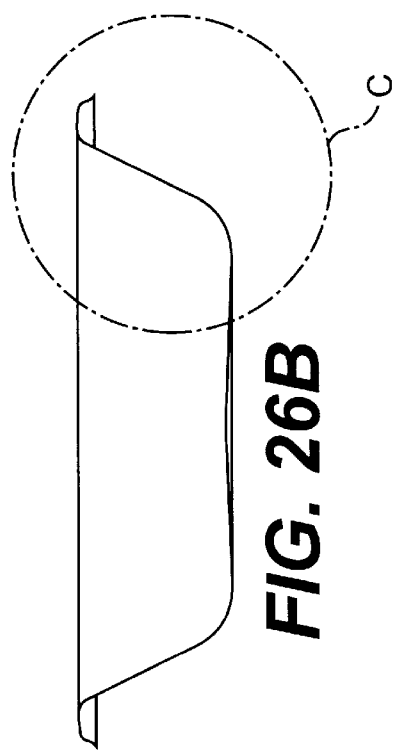
FIGS. 26A–26C are a cross-sectional view of a bowl of FIGS. 25A–25B.
Figure 26C:
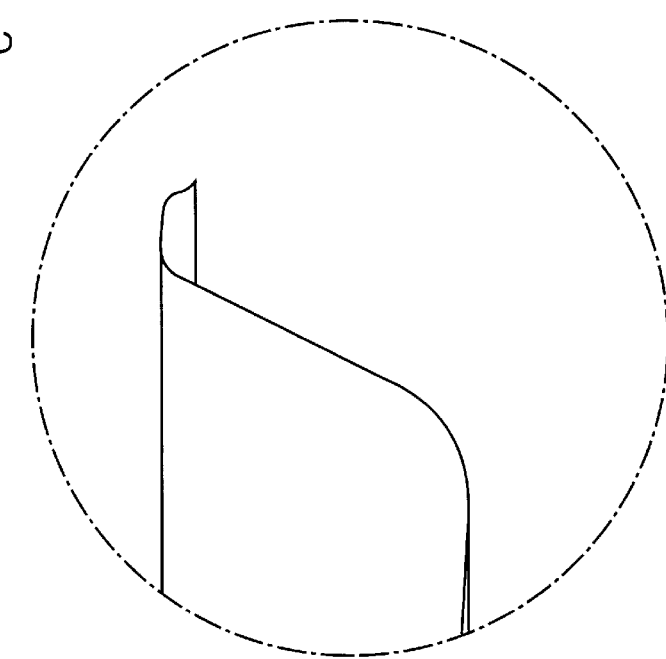
Figure 26A:
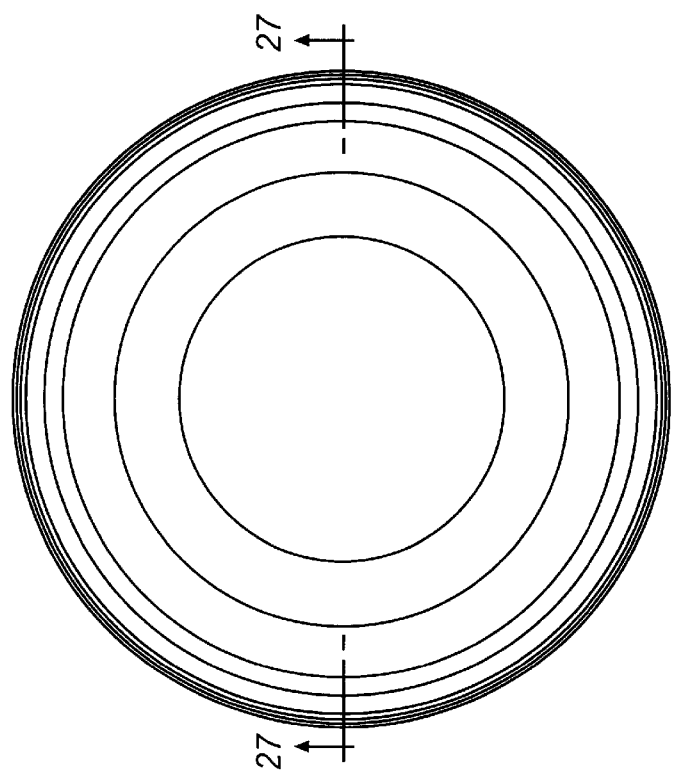
Figure 27:
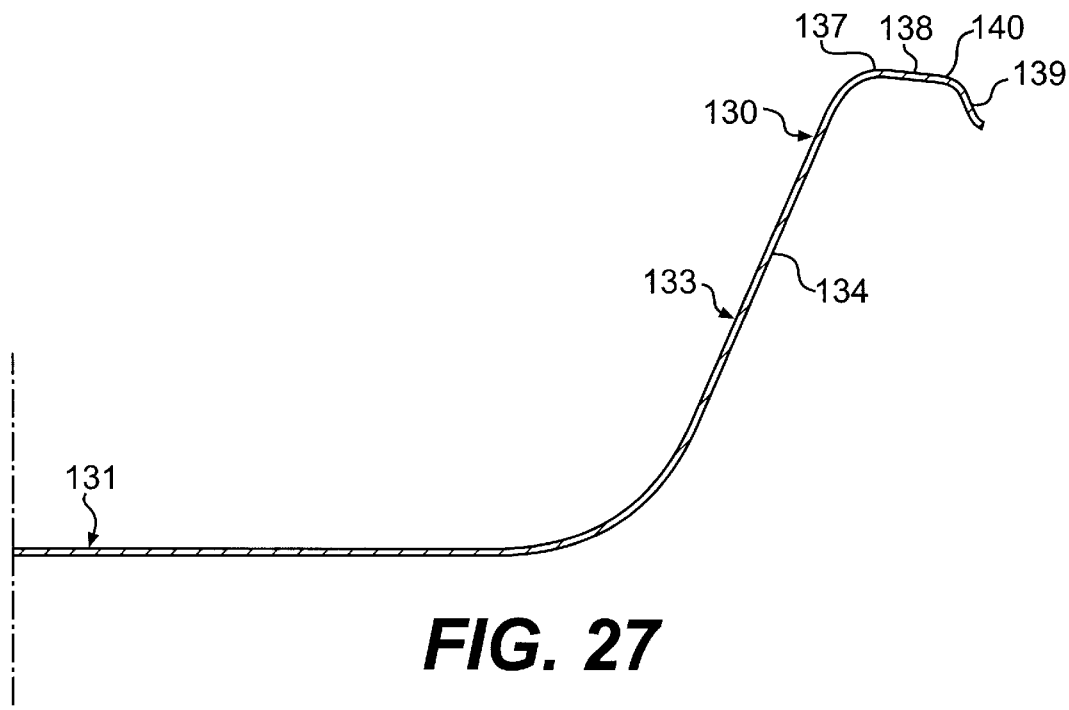
FIG. 27 is a radial cross section of a bowl of FIG. 25.
Figure 28:
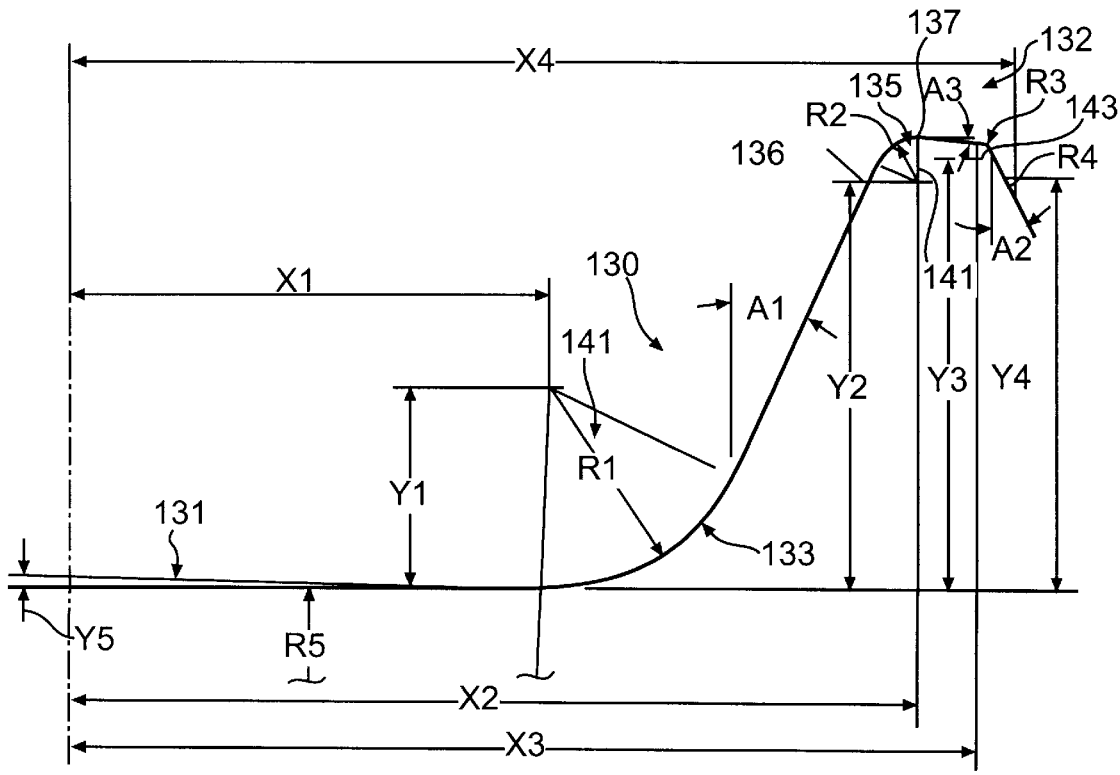
FIG. 28 is a schematic profile of the bowl shown in FIG. 25 beginning from the center line.

Throughout the following description, each of the dimensions are referenced with respect to a given diameter D which in, accordance with the present invention as illustrated in FIGS. 14 and 15, is approximately 8.75 inches. However, the particular diameter of the container is not a critical limitation and is only set forth herein by way of example. It is the relationship between the various portions of the rim configuration which are essential.

The planar inner region (61) in accordance with the illustrated embodiment in FIGS. 13 through 16 has a radius X1 which is equal to approximately 0.3 D–0.4 D and preferably 0.348 D. Adjoining an outer periphery of the planar inner region (61) is a sidewall portion (60) including annular region (63) having a radius of curvature equal to approximately 0.05 D–0.06 D and preferably 0.0572 D with the center point thereof being positioned a distance Y1 from the planar inner region (61). Included angle (70) of the annular region (63) is from about 40° to about 70° and preferably about 60°–65° or approximately 62°. Adjoining the periphery of the annular region (63) is the first frusto-conical region (64) which slopes upwardly at an angle A1 with respect to the vertical from about 20° to about 35° and preferably about 25°–30° or approximately 27.5°. Additionally, the frusto-conical region (64) is of a length greater than about 0.015 D, preferably from about 0.025 D to 0.05 D and more preferably approximately 0.036 D. Further, adjoining the first frusto-conical region (64) is the arcuate annular region (65) which includes a radius of curvature in the range of 0.015 D to 0.03 D and preferably approximately 0.024 D with the center point thereof being positioned a distance Y2 from the planar inner region (61). The included angle (71) of the arcuate annular region (65) may range from about 61° to about 82° and is preferably 66° to 77° or about 73°. The second portion (67) of the arcuate annular region (65), that is the distal portion of the arcuate annular region (65), is positioned such that a line tangent to the curvature of the arcuate annular region (65) at the second portion (67) slopes downwardly and outwardly at an angle of approximately 0° to 12°.

The combination of the annular region (63) and arcuate annular region (65) should combine to position the second portion (67) of the arcuate annular region (65) in the manner set forth herein above. That is, the included angle (70) of the annular region (63) when combined with the included angle (71) of the arcuate annular region (65) with the first frusto-conical region (64) spanning therebetween, positions the second portion (67) of the arcuate annular region (65) in a manner such that the second frusto-conical region (68), which extends substantially tangentially from the distal end of the second portion (67) of the arcuate annular region (65) extends outwardly and downwardly at an angle of about 0° to 12°. The second frusto-conical region (68) is of a length in a range from about 0.03 D to about 0.05 D and is preferably 0.04 D. Because the second frusto-conical region (68) extends substantially tangentially from the second portion (67) of the arcuate annular region (65), the second frusto-conical region (68) extends outwardly and downwardly at an angle A3 in the range from approximately 0° to 12° with respect to a horizontal plane formed by the planar inner region (61).

Adjoining an outer periphery of the second frusto-conical region (68) is the lip (69) which is in the form of yet another frusto-conical region which extends outwardly and downwardly from the second frusto-conical region (68). The lip (69) is of a length of at least 0.005 D and is preferably approximately 0.010 D. Further, the lip (69) extends at an angle A2 of no more than 45° from vertical, preferably approximately 15° to 30° with respect to the vertical plane.

At the transition between the second frusto-conical region (68) and the lip (69) is a transition region (72). The transition region (72) includes a radius of curvature R3 which is in the range of about 0.008 D and 0.01 D and is preferably approximately 0.0092 D with the center point thereof being positioned a distance Y3 from the planar inner region (61). Additionally, the transition region (72) has an included angle A4 of approximately 48° to 70°. The plates disclosed in FIGS. 17–20 have the dimensions of the plates disclosed in U.S. Pat. No. 5,088,040 and incorporated herein by reference in its entirety. These containers may have other features such as ridges, emboss, and deboss patterns suitable for enhancing the properties of the containers of this invention.

The description of FIGS. 21 through 24 is illustrative of the present invention, but it should be understood that these figures are not intended to limit the invention and that various changes may be made by those skilled in the art without changing the essential characteristics and basic concept of the invention. In one embodiment of this invention the trays have either the DIXIE® Superstrong profile as illustrated in FIGS. 21 through 24 and also described in U.S. Pat. No. 5,326,020 assigned to the assignee of the present invention and incorporated herein by reference into this application. These trays may have other features such as ridges, emboss, and deboss patterns suitable for enhancing the properties of the trays of this invention. A representative tray is illustrated in FIGS. 21 through 24. Throughout the following description, each of the dimensions are referenced to either the length D1 or the width D2, which in accordance with the present invention as illustrated in FIGS. 21 through 24 are approximately 10.90 and 8.00 inches respectively. D1 is larger than or equal to D2. However, the particular length and width of these containers is not a critical limitation and is only set forth herein by way of example. It is the relationship between the various portions of the rim configurations which are essential. The planar inner region (101) in accordance with the illustrated embodiment in FIGS. 21 and 22, has a length X1 which is equal to approximately 0.3 D1 to 0.4 D1 and 0.3 D2 to 0.4 D2 and preferably 0.354 D1 and preferably 0.342 D2. Adjoining an outer periphery of the planar inner region (101) is a sidewall portion (100) including annular region (103) having a radius of curvature equal to approximately 0.02 D1 to 0.03 D1 and 0.025 D2 to 0.035 D2 and preferably 0.023 D1 and 0.031 D2 with the center point thereof being positioned a distance Y1 from the planar inner region (101). Included angle (110) of the annular region (103) is from about 40° to about 80° and preferably about 65° to 75° or approximately 69°. Adjoining the periphery of the annular region (103) is the first frusto-conical region (104) which slopes upwardly at an angle A1 with respect to the vertical from about 10° to about 50° and preferably about 15° to 25° or approximately 21°. Additionally, the frusto-conical region (104) is of a length greater than about 0.05 D1 and 0.055 D2, preferably from about 0.1 D1 to 0.2 D1 and 0.15 D2 to 0.25 D2 and more preferably approximately 0.15 D1 and 0.19 D2. Further, adjoining the first frusto-conical region (104) is the arcuate annular region (105) which includes a radius of curvature in the range of 0.005 D1 to 0.007 D1 and 0.007 D2 to 0.009 D2 and preferably approximately 0.006 D1 and 0.008 D2 with the center point thereof being positioned a distance Y2 from the planar inner region (101). The included angle (111) of the arcuate annular region (105) may range from about 40° to about 92° and is preferably 65° to 87°. The second portion (107) of the arcuate annular region (105), that is the distal portion of the arcuate annular region (105) is positioned such that a line tangent to the curvature of the arcuate annular region (105) at the second portion (107) slopes downwardly and outwardly at an angle of approximately 0° to 12°.

The combination of the annular region (103) and arcuate annular region (105) should combine to position the second portion (107) of the arcuate annular region (105) in the manner set forth herein above. That is, the included angle (110) of the annular region (103) when combined with the included angle (111) of the arcuate annular region (105) with the first frusto-conical region (124) spanning therebetween, positions the second portion (107) of the arcuate annular region (105) in a manner such that the second frusto-conical region (108), which extends substantially tangentially from the distal end of the second portion (107) of the arcuate annular region (105) extends outwardly and downwardly at an angle of about 0° to 12°. The second frusto-conical region (108) is of a length in a range from about 0.045 D1 to about 0.055 D1 and 0.030 D2 to about 0.040 D2 and is preferably 0.052 D1 and 0.034 D2. Because the second frusto-conical region (108) extends substantially tangentially from the second portion (107) of the arcuate annular region (105), the second frusto-conical region (108) extends outwardly and downwardly at an angle A3 in the range from approximately 0° to 12° with respect to a horizontal plane formed by the planar inner region (161).

Adjoining an outer periphery of the second frusto-conical region (104) is the lip (109) which is in the form of yet another frusto-conical region which extends outwardly and downwardly from the second frusto-conical region (108). The lip (109) is of a length of at least 0.006 D1 and 0.009 D2 and is preferably approximately 0.010 D1 and 0.013 D2. Further, the lip (109) extends at an angle A2 of no more than 45° from vertical, preferably approximately 10° to 30° with respect to the vertical plane and more preferably approximately 20°.

At the transition between the second frusto-conical region (108) and the lip (109) is a transition region (112). The transition region (112) includes a radius of curvature R3 which is in the range of about 0.005 D1 to 0.007 D1 and 0.007 D2 to 0.009 D2 and is preferably approximately 0.006 D1 and 0.008 D2 with the center point thereof being positioned a distance Y3 from the planar inner region (21). Additionally, the transition region (112) has an included angle A4 of approximately 48° to 80°.

The description of FIGS. 25 through 28 is illustrative of the present invention, but it should be understood that these figures are not intended to limit the invention and that various changes may be made by those skilled in the art without changing the essential characteristics and basic concept of the invention. In one embodiment of this invention the bowl is illustrated in FIGS. 25 through 28. These containers may have other features such as ridges, emboss, and deboss patterns suitable for enhancing the properties of the containers of this invention. Throughout the following description, each of the dimensions are referenced with respect to a given diameter D which, in accordance with the present invention as illustrated in FIGS. 25 through 28, is approximately 7.5 inches. However, the particular diameter of the containers is not a critical limitation and is only set forth herein by way of example. It is the relationship between the various portions of the rim configuration which are essential. The planar inner region (131) in accordance with the illustrated embodiment in FIGS. 25 through 28, has a radius X1 which is equal to approximately 0.2 D to 0.3 D and preferably 0.25 D. Adjoining an outer periphery of the planar inner region (131) is a sidewall portion (130) including annular region (133) having a radius of curvature equal to approximately 0.05 D 0.15 D and preferably 0.11 D with the center point thereof being positioned a distance Y1 from the planar inner region (131). Included angle (141) of the annular region (133) is from about 45° to about 75° and preferably about 60° to 70° or approximately 65°. Adjoining the periphery of the annular region (133) is the first frusto-conical region (134) which slopes upwardly at an angle A1 with respect to the vertical from about 15° to about 45° and preferably about 20° to 30° or approximately 25°. Additionally, the frusto-conical region (134) is of a length greater than about 0.1 D, preferably from about 0.17 D to 0.19 D and more preferably approximately 0.18 D. Further, adjoining the first frusto-conical region (134) is the arcuate annular region (135) which includes a radius of curvature in the range of 0.015 D to 0.030 D and preferably approximately 0.023 D with the center point thereof being positioned a distance Y2 from the planar inner region (131). The included angle (142) of the arcuate annular region (135) may range from about 45° to about 87° and is preferably 60° to 77°. The second portion (137) of the arcuate annular region (135), that is the distal portion of the arcuate annular region (135) is positioned such that a line tangent to the curvature of the arcuate annular region (135) at the second portion (137) slopes downwardly and outwardly at an angle of approximately 0° to 12°.

The combination of the annular region (133) and arcuate annular region (135) should combine to position the second portion (137) of the arcuate annular region (131) in the manner set forth herein above. That is, the included angle (130) of the annular region (133) when combined with the included angle (131) of the arcuate annular region (135) with the first frusto-conical region (134) spanning therebetween, positions the second portion (137) of the arcuate annular region (135) in a manner such that the second frusto-conical region (138), which extends substantially tangentially from the distal end of the second portion (137) of the arcuate annular region (135) extends outwardly and downwardly at an angle of about 0° to 12°. The second frusto-conical region (138) is of a length in a range from about 0.02 D to about 0.04 D and is preferably 0.03 D. Because the second frusto-conical region (138) extends substantially tangentially from the second portion (137) of the arcuate annular region (135), the second frusto-conical region (138) extends outwardly and downwardly at an angle A3 in the range from approximately 0° to 12° with respect to a horizontal plane formed by the planar inner region (131).

Adjoining an outer periphery of the second frusto-conical region (134) is the lip (139) which is in the form of yet another frusto-conical region which extends outwardly and downwardly from the second frusto-conical region (138). The lip (139) is of a length of at least 0.01 D and is preferably approximately 0.017 D. Further, the lip (139) extends at an angle A2 of no more than 45° from vertical, preferably approximately 10° to 30° with respect to the vertical plane and more preferably approximately 25°.

At the transition between the second frusto-conical region (138) and the lip (139) is a transition region (143). The transition region (143) includes a radius of curvature R3 which is in the range of about 0.007 D and 0.012 D and is preferably approximately 0.009D with the center point thereof being positioned a distance Y3 from the planar inner region (131). Additionally, the transition region (142) has an included angle A4 of approximately 48° to 80°.

Figure 29:
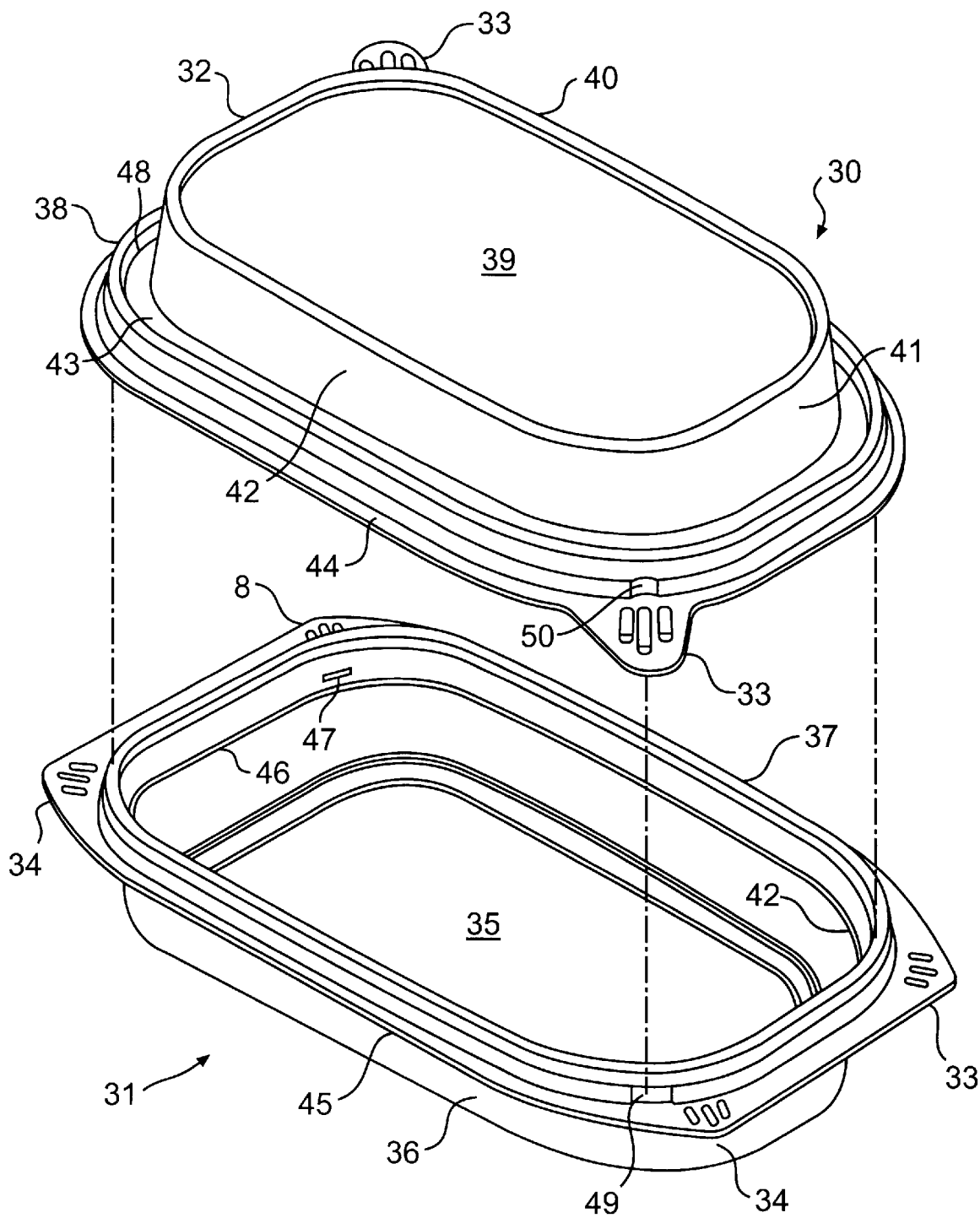
FIG. 29 is a drawing of a take-out food container included in this invention.

The description of FIG. 29 is illustrative of the present invention, but it should be understood that this figure is not intended to limit the invention and that various changes may be made by those skilled in the art without changing the essential characteristics and basic concept of the invention. The containers of this invention may be formed as take-out containers, and as a representative embodiment, a suitable take-out container, will now be described in general with respect to FIG. 29 wherein the lid and base formed as described in U.S. Pat. No. 5,377,860 and incorporated herein by reference is illustrated. While the container illustrated in FIG. 29 is oblong in configuration, the container may be round, oval, substantially rectangular or square as dictated by the contents which are to be placed within the container. The container (30) is formed of a base or bottom portion (31) and a lid (32). The lid (32) includes radially extending opening tabs (33) which cooperate with the radially extending opening tabs (34) of the base (31) in order to allow the consumer to readily open the sealed container. The base (31) of the container (30) includes a substantially planar bottom (35) and a substantially vertically extending peripheral sidewall (36). Integrally connected to the upstanding sidewall (31) is a sealing brim (37) which is received within a cooperating sealing brim (38) of the lid (32).

The lid (32) includes a substantially planar top portion (39) and a rim (40) extending about a periphery of the top portion (39). The rim (40) is provided in order to enhance the strength of an extended volume portion (41) of the lid (32). The rim (40) also serves to locate the base (31) on the lid when the lid is used as a stand.

The extended volume portion (41) is formed by extension wall (42) positioned about the perimeter of the rim (40) and extending downwardly therefrom. The extension wall (42) is integrally formed with a horizontal lid reinforcing ring (43) which is substantially parallel to the top portion (39) of the lid (32). The outer perimeter of the lid reinforcing ring (43) is further integrally formed with the sealing brim (38). Also, extending radially outward from the sealing brim (38) is a second horizontal lid reinforcing ring (44) which extends substantially parallel to the top portion (39) as well.

Similarly, the base (31) includes a horizontal lid reinforcing ring (45) which extends from the periphery of the sealing brim (37) for aiding in and maintaining the structural integrity of the sealing brim (37) as well as the container (30) as a whole. In addition to the reinforcing ring (45), a step (46) may be provided about an upper portion of the peripheral sidewall (36) for preventing nested units from becoming jammed together due to excessive interpenetration when stacked and nested. Also, formed in an upper portion of the sidewall (36) are undercuts (47) which cooperate with detents (48), only one of which is illustrated in FIG. 29 at the integral connection between a brim (38) and lid reinforcing ring (43). The detents, when engaged in the undercuts (47), provide an audible indication that the container is in fact sealed. Additionally, undercuts (49) may be provided in an outer periphery of the brim (37) for receiving detents (50) formed in an outer portion of the brim (38) for again providing an audible indication that the container is sealed. While the container illustrated in FIG. 29 shows detents and undercuts formed in both the inner and outer portions of the brims (47) and (38), respectively, it may be desired to provide respective detents and undercuts on only one side of the brim or to provide no undercuts and detents on either side of the brim.

The following examples are illustrative of the present invention. It should be understood that the examples are not intended to limit the invention and that various changes may be made by those skilled in the art without changing the essential characteristics and the basic concept of the invention.

EXAMPLE 1

Mica/talc filled polypropylene sheets (16 mil) and unfilled polypropylene sheets (22 mil) were extruded, as shown in FIG. 1, with conditions specified in Table 1. These extrusion process conditions may be varied as necessary to produce sheets which are of acceptable quality. Specifically, the operable temperature ranges for barrel zones 1, 2, and 3 are about respectively, 330 to 425° F., 400 to 450° F., and 450 to 500° F. The adaptor, feedblock, and die temperatures can all be in about the range of 450 to 500° F. The range of values for extruder drive amperes, extruder screw speed, melt pressure, die pressure, chill roll temperature, and line speed are about respectively, 12 to 20 amp., 60 to 150 RPM, 1500 to 2500 psi, 450 to 650 psi, 120 to 140° F., and 3 to 10 FPM. Sheets were subsequently vacuum thermoformed into 10.25 inch plates having the DIXIE® Superstrong profile as shown in FIGS. 13 through 16. Tables 2 and 3 show, respectively, rigidity values and caliper data for the sidewall, bottom, and flange (rim) areas of vacuum formed plates using condition (B) of FIG. 2. In each table, individual rigidity values are shown for each specimen. In addition, the caliper uniformity for sidewall, bottom, and flange areas are reported for each specimen, along with the summary statistics. Specifically, the caliper of each plate specimen in Tables 2 and 3 was measured ten times using a Fowler gauge for each of the three regions of interest consisting of the sidewall, bottom, and flange areas, and the average value for each plate specimen is reported along with the corresponding standard deviation (i.e., individual plate statistics). In the case of the three plates of Table 2, the caliper summary statistics (expressed in the average properties row) were obtained on the basis of averaging 30 measurements, wherein the standard deviation is reported for each of the three regions of interest. In the case of the five plates of Table 3, the caliper summary statistics were calculated on the basis of averaging 50 measurements where again the standard deviation is reported for each of the three regions of interest. Therefore, the caliper data of Tables 2 and 3 located in the average property rows pertain to global statistics rather than individual plate statistics. The caliper uniformity parameter consists of the coefficient of variation (COV) which is calculated as the standard deviation of caliper divided by the mean caliper, whereas the ratio is multiplied by 100, whereas the above described global averages and associated standard deviations are employed. A lower COV value is desirable since it signifies improved caliper uniformity for mica/talc filled polypropylene plates with respect to unfilled polypropylene plates. Tables 2 and 3 show that talc/mica reduces COV of polypropylene from about 10 to as low as 2 in sidewall and flange area. Table 3 shows the improved properties of a talc/mica polypropylene plates. The improvement of caliper uniformity is critical for promoting plate dimensional stability during food transport and microwave cooking operations. In great contrast to mica/talc filled polypropylene plates, the unfilled polypropylene plates exhibited poor quality as evidenced by poorly defined rim area, and sharkskin, very rough surface. These data demonstrate that mica/talc mixed filler greatly improves the drawability of polypropylene as evidenced by improved caliper uniformity, as well as improved thermoformability, both of which are due to enhanced melt strength relative to unfilled polypropylene. Mica/talc mixed filler is a suitable reinforcing mineral filler for enhancing the melt strength because of its highly regular, high aspect ratio morphology which can be thought of as resulting in "inter-particle connectivity" or "physical crosslinking." The significant reinforcing effect of mica/talc filler is also evidenced by a SSI plate rigidity value of 470 grams per 0.5 inches for PP/mica/talc at a basis weight of about 250 lbs. per 3000 square foot ream versus 340 grams per 0.5 inches for unfilled PP at a basis weight of about 280 lbs. per 3000 square foot ream.

TABLE 1

Sheet Extrusion Conditions for Mica/Talc Filled Polypropylene and Unfilled Polypropylene

| CONDITION | PP/MICA/TALC | UNFILLED PP |
| --- | --- | --- |
| Barrel zone 1 (° F.) | 395 | 395 |
| Barrel zone 2 (° F.) | 425 | 425 |
| Barrel zone 3 (° F.) | 475 | 475 |
| Adaptor temp (° F.) | 470 | 450 |
| Feed block temp (° F.) | 470 | 460 |
| Die zones 1–3 temp (° F.) | 470 | 475 |
| Die pressure (psi) | 700–800 | 825 |
| Extruder RPM | 80 | 70 |
| Extruder drive amperes | 20 | 19 |
| Melt pressure (psi) | 2050–2375 | 1780 |
| Single layer extrusion line speed (FPM) | 6.5–7.5 | 5.0 |
| Target sheet caliper/width (mil/in.) | 16/17 | 22/17 |
| Chill roll temp. (°F.) | 130–135 | 137 |

TABLE 2

Caliper and SSI Rigidity Data for 10¼ Inch Plates Thermoformed From Unfilled Polypropylene Sheet

| Plate Specimen ID | SSI Rigidity (g/0.5 in.) | Sidewall Caliper (mil) | Bottom Caliper (mil) | Flange Caliper (mil) |
| --- | --- | --- | --- | --- |
| 72-6 | 364 | 18.7 ± 1.9 | 20.7 ± 0.8 | 22.9 ± 2.8 |
| (COV)* | | 10.1 | 3.9 | 12.2 |
| 72-7 | 382 | 19.2 ± 2.0 | 20.6 ± 0.4 | 23.3 ± 0.8 |
| (COV) | | 10.4 | 1.9 | 3.4 |
| 72-8 | 280 | 19.6 ± 1.9 | 20.6 ± 0.5 | 23.3 ± 2.8 |
| (COV) | | 9.7 | 2.4 | 12.0 |
| Average Properties | 342 ± 54.4 | 19.19 ± 1.89 | 20.64 ± 0.58 | 23.15 ± 2.21 |
| (COV) | 15.9 | 9.85 | 2.81 | 9.55 |

*COV = Coefficient of Variation

TABLE 3

Caliper, SSI Rigidity Data, Product Weight and Cost Data for 10¼ inch Plates Thermoformed From Polypropylene/Mica/Talc/TiO$_2$ Sheet

| Plate Specimen ID | SSI Rigidity (g/0.5 in.) | Sidewall Caliper (mil) | Bottom Caliper (mil) | Flange Caliper (mil) | Basis Weight lbs/3000 sq. ft. ream | Overall Caliper (mil) | Plate Weight (g) | Material Cost Per Plate (Cents) |
| --- | --- | --- | --- | --- | --- | --- | --- | --- |
| 85-1* | 473 | 14.8 ± .52 | 13.8 ± .32 | 16.4 ± .62 | 267.1 | 15.0 | 26.66 | 3.06 |
| (COV) | | 3.5 | 2.3 | 3.8 | | | | |

TABLE 3-continued

Caliper, SSI Rigidity Data, Product Weight and Cost Data for
10¼ inch Plates Thermoformed From Polypropylene/Mica/Talc/TiO₂ Sheet

| Plate Specimen ID | SSI Rigidity (g/0.5 in.) | Sidewall Caliper (mil) | Bottom Caliper (mil) | Flange Caliper (mil) | Basis Weight lbs/3000 sq. ft. ream | Overall Caliper (mil) | Plate Weight (g) | Material Cost Per Plate (Cents) |
|---|---|---|---|---|---|---|---|---|
| 85-2* (COV) | 466 | 14.6 ± .38 2.6 | 13.3 ± .09 0.7 | 15.9 ± .49 3.1 | 250.0 | 14.6 | 25.00 | 2.93 |
| 85-3* (COV) | 470 | 14.3 ± .60 4.2 | 13.5 ± .18 1.3 | 15.4 ± .32 2.1 | 250.2 | 14.4 | 24.73 | 2.96 |
| 85-4* (COV) | 452 | 13.7 ± .52 3.8 | 13.4 ± .08 0.6 | 16.0 ± .43 2.7 | 243.1 | 14.4 | 24.47 | 2.99 |
| 85-5* (COV) | 378 | 12.6 ± .29 2.3 | 12.6 ± .22 1.7 | 15.0 ± .70 4.7 | 227.1 | 13.4 | 22.46 | 2.80 |

*85-1 = 0% Mica 40% Talc
*85-2 = 10% Mica 30% Talc
*85-3 = 20% Mica 20% Talc
*85-4 = 30% Mica 10% Talc
*85-5 = 40% Mica 0% Talc

EXAMPLE 2

Extruded mica/talc filled polypropylene sheets prepared as described in Example 1 were characterized with respect to surface gloss and roughness. Table 4 shows 75 and 60 degree gloss and Parker Roughness (airflow method) data for an extruded mica/talc filled polypropylene sheet versus same properties for the food contact (air) side of vacuum formed 10.25 inch plates produced according to condition (B) of FIG. 2 using the same sheet formulation. The unique thermally induced micronodular surface is characterized by significant decrease in gloss and significant increase in roughness as shown in the five photomicrographs in FIGS. 3 through 5, which results in a stoneware or pottery-like appearance with aesthetic appeal. The use of mica/talc mixtures in polypropylene advantageously further allows controlling the degree of thermally induced stoneware texture, feel, and appearance.

The Parker Roughness method was used to determine roughness using the Messmer Parker Print-Surf Roughness. Operation procedure details are referenced in the Messmer Instruments Ltd. user manual for the instrument (Model No. ME-90) which is distributed by Huygen Corporation. The flat specimen is clamped under 1 Mpa pressure against a narrow annular surface by a soft backing and the resistance of air flow of the gap between the specimen and the annulus is measured. The air flow is proportional to the cube of the gap width and the roughness is expressed as the root mean cube gap in units of micrometers. Higher Parker roughness values indicate higher degrees of surface roughness. Gloss is reported as "gloss units at 75 or 60 degrees." Gloss measurements were conducted following TAPPI Standard Method T-480-OM 92. The Parker Roughness and plate gloss values are set forth in FIGS. 6, 10, 11 and 12.

TABLE 4

GLOSS AND ROUGHNESS PROPERTIES OF THE FOOD CONTACT SIDE OF
POLYPROPYLENE/MICA/TALC/TIO₂
PLATE SURFACE VERSUS NEAT EXTRUDED SHEET

| SAMPLE ID | MICA WT % | TALC WT % | GLOSS (75 DEGREES)* | GLOSS (60 DEGREES)* | PARKER ROUGHNESS (MICRONS) |
|---|---|---|---|---|---|
| 85-1 Sheet | 0 | 40 | 39.9 | 19.1 | 4.880 |
| 85-2 Sheet | 10 | 30 | 42.6 | 24.9 | 5.377 |
| 85-3 Sheet | 20 | 20 | 41.7 | 24.7 | 5.787 |
| 85-4 Sheet | 30 | 10 | 42.8 | 28.5 | 6.477 |
| 85-5 Sheet | 40 | 0 | 52.2 | 34.3 | 7.723 |
| 85-1 (Plate) | 0 | 40 | 23.5 | 7.6 | 12.194 |
| 85-2 (Plate) | 10 | 30 | 19.0 | 6.2 | 14.796 |
| 85-3 (Plate) | 20 | 20 | 16.3 | 5.4 | 15.378 |
| 85-4 (Plate) | 30 | 10 | 13.4 | 4.8 | 17.736 |
| 85-5 (Plate) | 40 | 0 | 12.1 | 4.3 | 17.834 |

* = Average of Machine and Cross Machine Directions

As shown in Table 4, the food contact side is rougher as evidenced by increased roughness and decreased gloss relative to the neat extruded sheet. The rough appearance is desirable for purpose of creating the micronodular surface giving the container and plate a stoneware look. The matte and rough thermally induced texture of the plates is advantageously controlled by adjusting upward the mica/talc ratio at constant total filler loading to also preserve strength properties.

Figure 7:
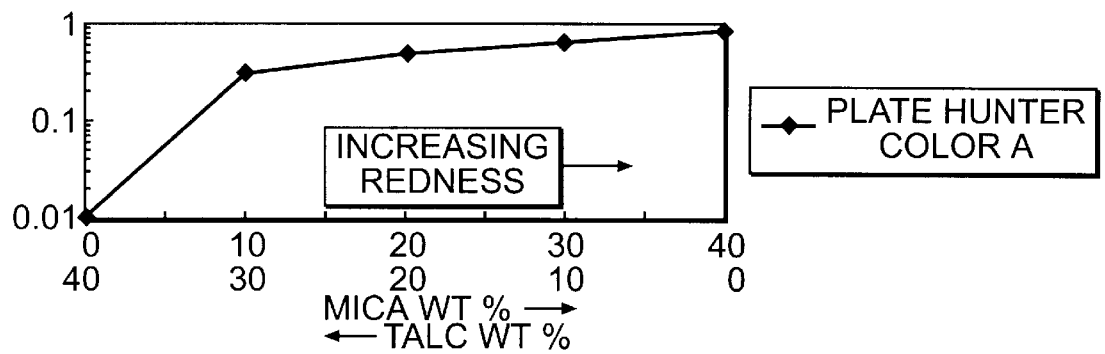
FIG. 7 is a graph depicting the increase in redness character of the plates with increasing mica/talc ratio.
Figure 8:
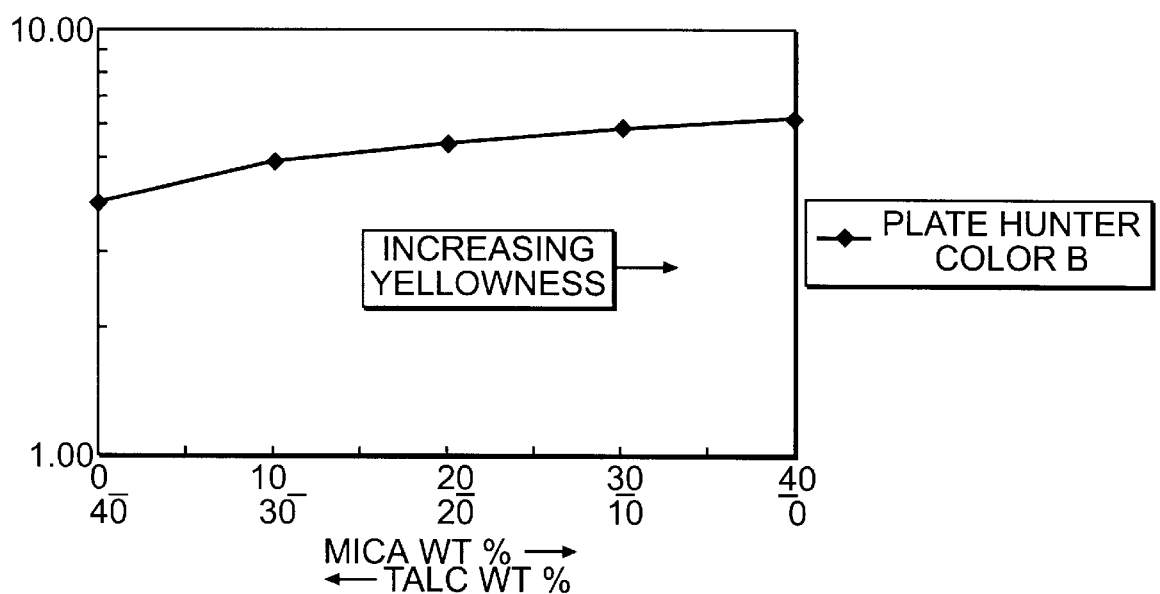
FIG. 8 is a graph depicting the increase in yellowness character of the plates with increasing mica/talc ratio.
Figure 9:
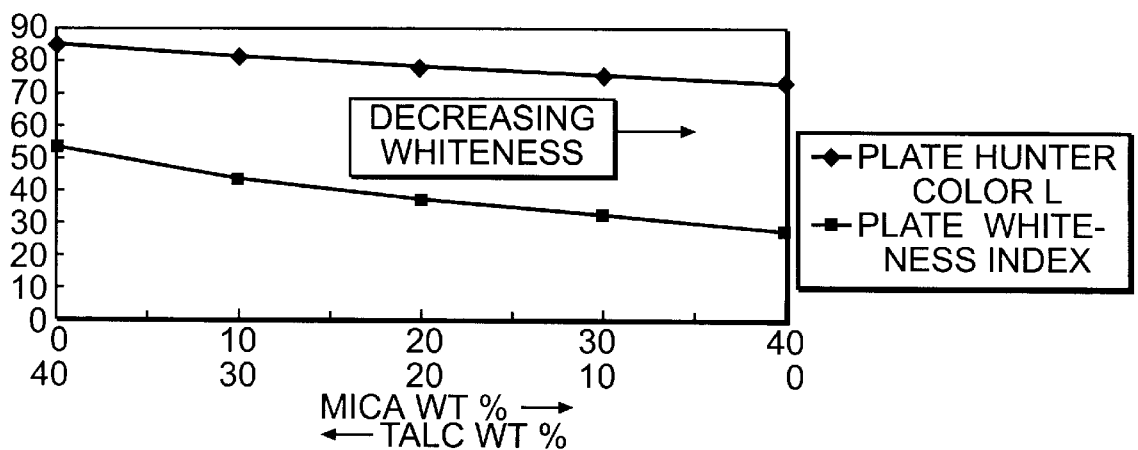
FIG. 9 is a graph depicting the decrease in whiteness character of the plates with increasing mica/talc ratio.
Figure 10:
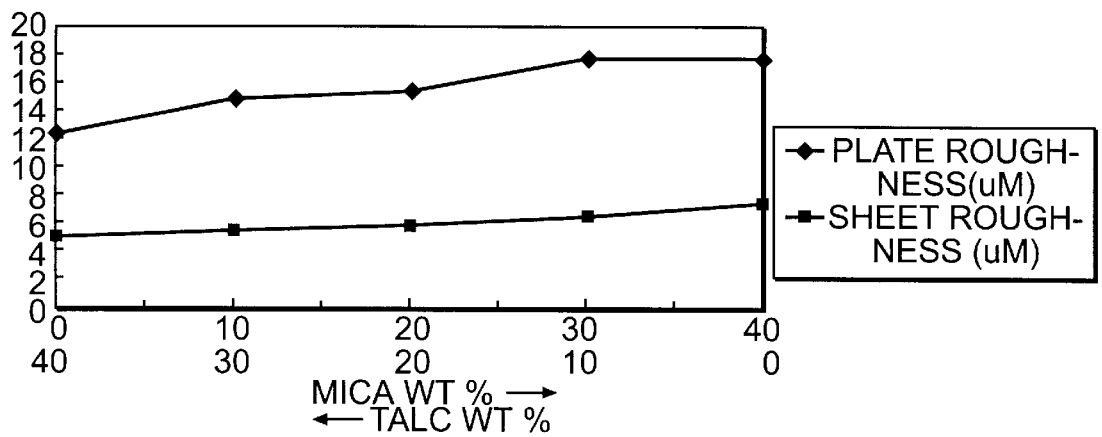
FIG. 10 is a graph depicting the increase in plate roughness and sheet roughness increasing mica/talc ratio.
Figure 11:
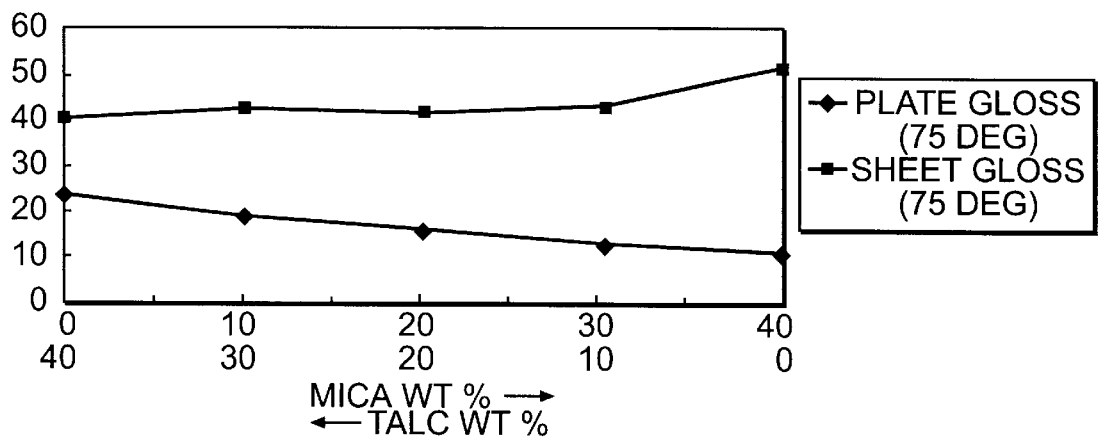
FIG. 11 is a graph depicting the differences in sheet and plate 75 degree gloss for various talc and mica combinations.
Figure 12:
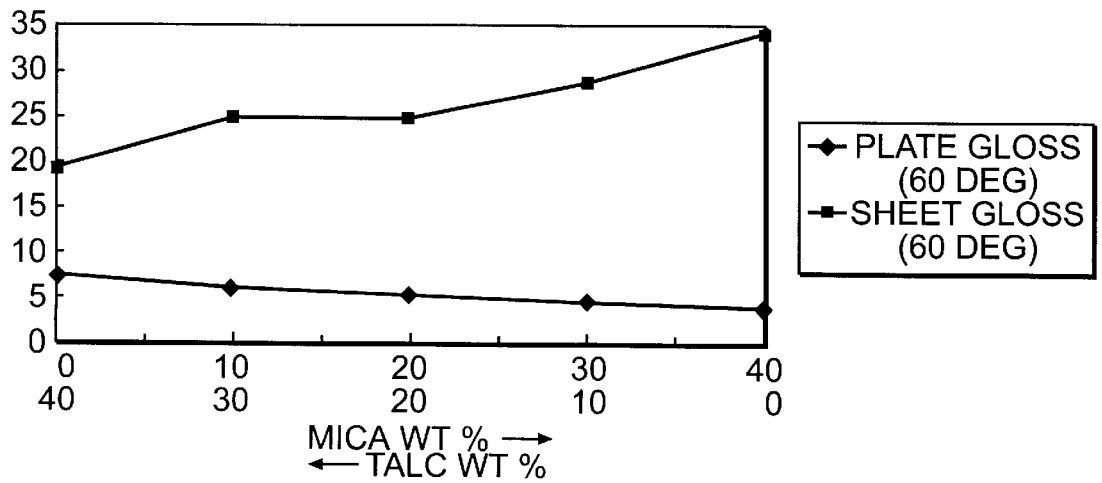
FIG. 12 is a graph depicting the differences in sheet and plate 60 degree gloss for various talc and mica combinations.
Figure 13B:
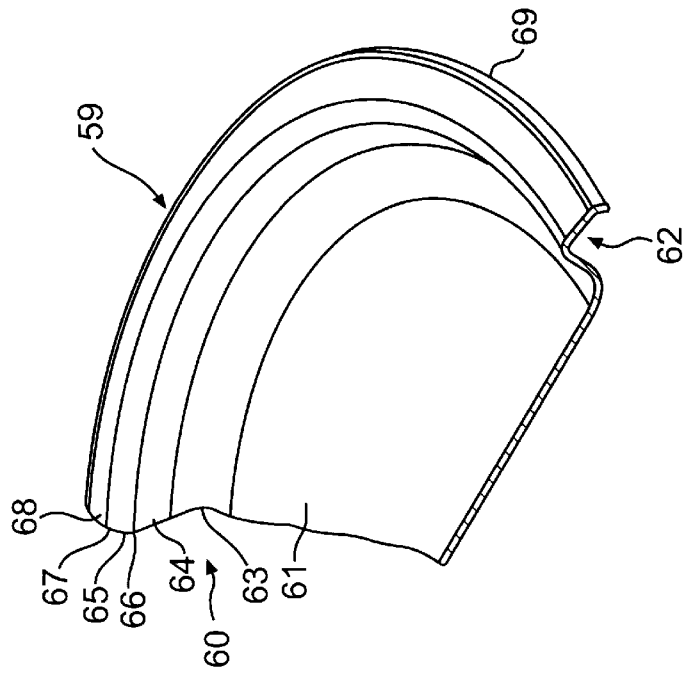
FIGS. 13A and 13B are a drawing of a plate included in this invention.
Figure 13A:
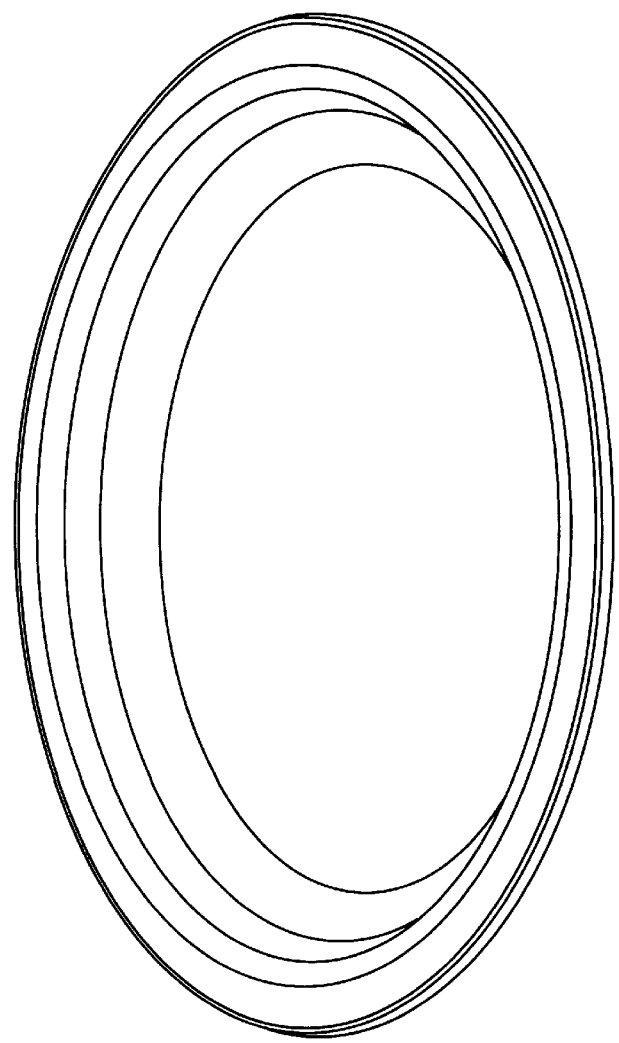

Table 5 shows the Hunter color and whiteness index data for the mica/talc filled plates of this invention. Lower Hunter color L and whiteness index values are preferred and achieved by adjusting upward the mica/talc ratio at constant filler loading to also preserve strength properties. Conversely higher Hunter colors a and b values are preferred. Hunter color L, a, and b values are also set forth in FIGS. 7, 8, and 9.

Hunter color L, a, and b parameters were measured using TAPPI Method T 524 OM-94. The symbols L, a, b designate color values as follows: L denotes lightness increasing from zero for black to 100 for perfect white; a shows redness when plus, greenness when minus, and zero for gray; and b represents yellowness when plus, blueness when minus, and zero for gray.

Whiteness index was measured according to procedures outlined in the publication "Measurement and Control of the Optical Properties of Paper" by Technidyne Corporation, New Albany, Ind.

TABLE 5

Plate HUNTER Color L, a, b, and Whiteness Index Data

| SAMPLE ID | MICA WT % | TALC WT % | HUNTER COLOR L | HUNTER COLOR a | HUNTER COLOR b | WHITENESS INDEX |
| --- | --- | --- | --- | --- | --- | --- |
| 85-1 | 0 | 40 | 84.97 | 0.01 | 3.90 | 52.98 |
| 85-2 | 10 | 30 | 81.78 | 0.31 | 4.88 | 43.86 |
| 85-3 | 20 | 20 | 79.02 | 0.49 | 5.42 | 37.74 |
| 85-4 | 30 | 10 | 76.85 | 0.65 | 5.83 | 33.23 |
| 85-5 | 40 | 0 | 74.60 | 0.86 | 6.22 | 28.93 |

TABLE 6

Size/Shape Characterization of Filler Particles from SEM of Ashed Filled PP

| FILLER PARTICLE TYPE | PARTICLE SIZE AVERAGE ($\mu$M) | PARTICLE SIZE RANGE ($\mu$M) | ASPECT RATIO RANGE ($\mu$M) |
| --- | --- | --- | --- |
| Mica | 29 ± 26 | 8–126 | 16–252 |
| Talc | 15 ± 6 | 4–30 | 8 ± 60 |

In Table 6, the physical properties of the mica and talc used herein are set forth. Mica and talc filler particle size and aspect ratio (diameter to thickness quotient) parameters were estimated by scanning electron microscopy (SEM) using ashed plate samples. The ashed samples were coated with gold/palladium and suspended in carbon paint (colloidal graphite) substrate prior to introduction in the SEM. Thereafter filler particle sizes and aspect ratios were obtained from examination of SEM photomicrographs taken in the magnification range of 500–5,000× at 15 kv.

EXAMPLE 3

FIG. 30 shows rigidity versus current plate material cost comparisons for mica/talc filled polypropylene plates versus competitor plastic disposable plates. "J" refers to mica/talc filled polypropylene plate of this invention and "S" refers to polystyrene based plates such as those currently manufactured by Solo Cup Company. Average plate calipers are indicated for each plate type and size. In the case of S, plate weights are 28.9 and 23.06 g. for 10.25 inch and 9 inch sizes, respectively, which corresponds to 2.9 and 2.3 cents computed on the basis of 46 cents/lb. price for high impact polystyrene. The left side of the diagram shows data for 8.75 inch PP/40% mica plates whereby the J plate rigidity is about three times higher than S at significantly reduced caliper and cost. The right side of the diagram shows data for 10.25 inch PP/40% mica plates whereby J plate rigidity is more than seven times higher than S at the same caliper of 19 mil.

EXAMPLE 4

The plates of this invention having at least 10% mica were microwave tested along with products comprising polypropylene filled with 40% talc. Plates were tested in the microwave (Samsung model MW 8690) using the highest power setting (10) with a variety of eight types of foods. The cooking times and associated foods corresponded to aggressive test conditions which are set forth in Table 7. Heating/cooking and/or reconstituting times and procedures corresponded as close as possible to food instructions on the package. Foods were transferred to plates and covered loosely with wax paper as indicated when appropriate. Frozen foods were subjected to the cooking process in a semi-thawed state. After cooking, the plates were gently washed with warm water and inspected for changes from their original state as a result of microwaving under food load in addition to noting type and extent of such changes while the food was present on them during and after the food cooking and/or reconstituting processes.

Plate microwave performance was assessed with respect to heat resistance (i.e., warping and dimensional stability) and chemical resistance (i.e., staining, sticking, and grease resistance). The plates of this invention having at least 10% mica and 30% talc had superior properties to polystyrene plates as shown in Example 5, U.S. Ser. No. 8,733,463 filed on Oct. 18, 1996, and incorporated herein in its entirety. In the cases of "barbecue pork rib" and "beans with pork in tomato sauce," resistance to warping and staining was more satisfactory, and in the case of the "donut," resistance to both warping and grease was superior relative to PP/40% talc. For very high fat content foods such as "butter," better grease resistance was noted, while in the case of "pancakes with syrup," very good resistance to sticking was obtained relative to PP/40% talc. The tests demonstrated that when the plate composition comprised 10–30% mica and 10–30% talc, better heat and chemical resistance was obtained relative to PP/40% talc.

TABLE 7

| Test | Food Type | Cooking Time (min.) | Cover Material |
| --- | --- | --- | --- |
| 1 | Sugar glazed long john donut | 1 | none |
| 2 | Frozen broccoli with cheese sauce (Green Giant, 10 oz.) | 5 | wax paper |
| 3 | Frozen pepperoni pizza (Tombstone, 7 oz.) | 4 | none |
| 4 | Frozen dinner barbecue pork rib, mashed potatoes, corn (Banquet, 10 oz.) | 5 | wax paper |
| 5 | Beans with pork and tomato sauce (Campbell, 8 oz. can) | 2 | wax paper |
| 6 | Frozen breakfast pancakes with syrup and bacon (Swanson 4.5 oz.) | 2 | wax paper |
| 7 | Butter (5 teaspoons) (Roundy's, Sweet cream) | 3 | wax paper |
| 8 | Raw cured bacon, 3 strips (Farmland, lower sodium) | 5 | paper towels |

We claim:

1. A microwaveable, food contact compatible disposable, rigid container comprising an extruded sheet consisting essentially of an admixture of polypropylene, mica, talc, a coupling agent for promoting adherence between the polypropylene and the mica and talc, and a pigment, thermoformed by application of vacuum into the shape of a container wherein a loading level of mica and talc in the admixture is from about 7% to about 60% and the weight ratio of talc to the mica is controlled to achieve a micronodular surface on at least one side of the container, said container further exhibiting: a melting point of no less than about 250° F.; said container being dimensionally stable and resistant to grease, sugar, and water at temperatures up to about 220° F. and of sufficient toughness to be resistant to cutting by serrated polystyrene flatware.

2. The microwaveable container of claim 1 wherein the polypropylene is a propylene-ethylene copolymer or blend and wherein the ethylene moiety in said copolymer or blend comprises less than 10 mole percent of said propylene-ethylene copolymer or blend.

3. The container of claim 1 wherein the polypropylene in the sheet is isotactic polypropylene homopolymer having a melt flow rate of about 0.1 to about 5.0.

4. The container of claim 1 wherein the coupling agent comprises a maleic anhydride modified polypropylene or acrylic modified polypropylene in a concentration of about 0.5 to about 3 weight percent based on the total weight of the container.

5. The container of claim 1 wherein the pigment is titanium dioxide.

6. The container of claim 1 wherein the pigment is carbon black.

7. The container of claim 1 wherein the container exhibits a melting point of about 250 to about 330° F.

8. The container of claim 1 wherein the polypropylene comprises about 40 to 90 percent by weight, the mica and talc together comprise about 7 to 59 percent by weight, and the pigment comprises about 0.5 to 3 percent by weight of said admixture.

9. A microwaveable, food contact compatible, disposable, rigid container comprising an extruded sheet consisting essentially of an admixture of polypropylene, mica and talc, and a pigment, thermoformed by application of vacuum into the shape of a container wherein a loading level of mica and talc in the admixture is from about 7% to about 60%; said container further exhibiting:

(a) a melting point of no less than about 250° F.; and (b) a basis weight of at least 130 lbs. per 3000 square foot ream;

said container being dimensionally stable and resistant to grease, sugar, and water at temperatures up to about 220° F. and of sufficient toughness to be resistant to cutting by serrated polystyrene flatware.

10. A microwaveable, food contact compatible, disposable, rigid container comprising an extruded sheet consisting essentially of an admixture of polypropylene, mica, talc, and a pigment, formed or thermoformed by application of vacuum into the shape of a container wherein a loading level of mica and talc in the admixture is from about 7% to about 60% and wherein the weight percent of the talc to the mica is controlled to achieve a micronodular surface on at least one side of the container, said container exhibiting:

(a) a basis weight of at least 130 lbs. per 3000 square foot ream; and (b) a melting point of no less than about 250° F.;

said container being dimensionally stable and resistant to grease, sugar, and water at temperatures up to about 220° F. and of sufficient toughness to be resistant to cutting by serrated polystyrene flatware.

11. A microwaveable, food contact compatible, disposable, rigid container comprising an extruded sheet consisting essentially of an admixture of polypropylene, a talc and mica mixture, a coupling agent for promoting adherence between the polypropylene and the talc and mica mixture and a pigment, formed or thermoformed into the shape of a container; said container further exhibiting:

(a) a melting point of no less than about 250° F.;

said container being dimensionally stable and resistant to grease, sugar, and water at temperatures up to at least 220° F. and of sufficient toughness to be resistant to cutting by serrated polystyrene flatware.

12. A microwaveable, food contact compatible, disposable, rigid and strong plate comprising an extruded sheet consisting essentially of an admixture of polypropylene, a talc and mica mixture, a coupling agent for promoting adherence between the polypropylene and mica and talc mixture, and a pigment, formed, thermoformed, or thermoformed by application of vacuum, into the shape of a plate wherein the weight ratio of the talc to the mica is controlled to achieve a micronodular surface on at least one side of the plate, said plate further exhibiting:

(a) a melting point of no less than about 250° F.; and (b) thickness uniformity characterized by a thickness coefficient variation of less than five percent; said plate being dimensionally stable and resistant to grease, sugar, and water at temperatures up to at least 220° F. and of sufficient toughness to be resistant to cutting by serrated polystyrene flatware.

13. The microwaveable plate of claim 12 wherein the extruded sheet is selected for a propylene-ethylene copolymer and blend and mixtures of these wherein the ethylene moiety comprises less than ten mole percent of the total copolymer.

14. The plate of claim 12 having a diameter selected from 8.75 inches, 9.0 inches, 10.0 inches, 10.25 inches, or 11.0 inches.

15. The plate of claim 12 wherein the coupling agent comprises maleic anhydride or acrylic modified polypropylene.

16. The plate of claim 12 wherein the pigment is titanium dioxide.

17. The plate of claim 12 wherein the pigment is carbon black.

18. The plate of claim 12 wherein the plate exhibits a melting point of about 250 to about 330° F.

19. The plate of claim 12 wherein the polypropylene comprises about 40 to 90 percent by weight, the mica and talc mixture comprises about 7 to 59 percent by weight, and the pigment comprises about 0.5 to 3 percent by weight of said admixture.

20. The plate of claim 14 wherein at a diameter of 8.75 inches and at a basis weight of at least 175 pounds per 3000 square foot ream, the plate exhibits a SSI rigidity of at least 250 grams per 0.5 inch.

21. The plate of claim 14 wherein at a diameter of 10.25 inches and at the basis weight of at least about 280 pounds per 3000 square foot ream, the plate exhibits a SSI rigidity of at least 400 grams per 0.5 inch.

22. A microwaveable, food contact compatible, disposable, rigid plate comprising an extruded sheet consisting essentially of an admixture of polypropylene, a talc and mica mixture, a coupling agent for promoting adherence between the polypropylene and the talc and mica mixture formed or thermoformed into the shape of a plate; said plate exhibiting:

(a) a melting point of no less than about 250° F.; and (b) a thickness uniformity characterized by a thickness coefficient variation of less than five percent; said plate being dimensionally stable and resistant to grease, sugar, and water at temperatures up to at least 220° F. and of sufficient toughness to be resistant to cutting by serrated polystyrene flatware.

23. A microwaveable, food contact compatible, disposable, rigid container comprising an extruded sheet consisting essentially of an admixture of polypropylene, a talc and mica mixture, a coupling agent for promoting adherence between the polypropylene and the talc and mica mixture, and a pigment, formed, thermoformed, or thermoformed by application of vacuum, into the shape of a container wherein the weight ratio of the talc to the mica is controlled to achieve a micronodular surface on at least one side of the container, said container further exhibiting:
a melting point of no less than about 250° F.; said container being dimensionally stable and resistant to grease, sugar, and water at temperatures up to about 220° F. and of sufficient toughness to be resistant to cutting by serrated polystyrene flatware, the container including a base portion and a lid portion comprising:
I (a) a bottom;
  (b) an upwardly extending peripheral wall joined to said bottom, said upwardly extending peripheral wall having an inwardly tapering frusto-conical base seal area formed therein; and
  (c) a downwardly and outwardly extending brim joined to said upwardly extending peripheral wall, said brim having an undercut secondary seal ridge formed therein; and a unitary lid comprising:
II (a) a top joined to;
  (b) a downwardly extending peripheral wall to;
  (c) an upwardly extending wall having a frusto-conical lid seal area formed therein, said frusto-conical lid seal area being mateable with the frusto-conical base seal area;
  (d) a downwardly extending wall having a secondary seal furrow mateable with said secondary seal ridge; and
  (e) resilient lid realignment means located between said secondary seal furrow and said frusto-conical lid seal area for simultaneously urging said frusto-conical base seal area into close engagement with said frusto-conical lid seal area while urging said secondary seal ridge into engagement with said secondary seal furrow.

24. The microwaveable container of claim 23 wherein the polypropylene is a propylene-ethylene copolymer or blend and wherein the ethylene moiety in said copolymer or blend comprises less than 10 mole percent of said propylene-ethylene copolymer or blend.

25. The container of claim 23 wherein the coupling agent is selected from a maleic anhydride modified polypropylene and acrylic modified polypropylene.

26. The container of claim 23 wherein the pigment is titanium dioxide.

27. The container of claim 23 wherein the pigment is carbon black.

28. The container of claim 23 wherein the container exhibits a melting point of about 250 to about 330° F.

29. The container of claim 23 wherein the polypropylene comprises about 40 to 80 percent by weight, the mica and talc mixture comprises about 19 to 59 percent by weight, and the pigment comprises about 0.5 to 3 percent by weight of said admixture and wherein the container has a basis weight of about 130 pounds to 950 pounds per 3000 square foot ream.

30. The container of claim 1 in the form of a cup.

31. The container of claim 1 in the form of a bowl.

32. The container of claim 1 or claim 10 in the form of a tray.

33. The container of claim 1 in the form of a bucket.

34. The container of claim 1 in the form of a soufflé dish.

35. A microwaveable, food contact compatible, disposable, rigid lid comprising an extruded sheet consisting essentially of an admixture of polypropylene, a talc and mica mixture, a coupling agent for promoting adherence between the polypropylene and the talc and mica mixture, and a pigment, formed, thermoformed, or thermoformed by application of vacuum, into the shape of a lid wherein the weight ratio of the talc to the mica is controlled to achieve a micronodular surface on at least one side of the lid, said lid further exhibiting: a melting point of no less than about 250° F.; said lid being dimensionally stable and resistant to grease, sugar, and water at temperatures up to about 220° F.

36. The lid of claim 35 wherein the micronodular surface of the lid is not in contact with the food.

37. A microwaveable, food contact compatible, disposable, rigid extruded sheet consisting essentially of an admixture of polypropylene, a talc and mica mixture, a coupling agent for promoting adherence between the polypropylene and the talc and mica mixture, and a pigment, thermoformed by application of vacuum into the shape of a container; said sheet exhibiting a softening point of no less than about 250° F.; said sheet being dimensionally stable and resistant to grease, sugar, and water at temperatures of about 220° F. and of sufficient toughness to be resistant to cutting by serrated polystyrene flatware; said sheet being capable of forming a micronodular surface on one side when subjected to vacuum forming.

38. The sheet of claim 37 having a basis weight of about 200–950 lbs. per 3000 square foot ream.

39. The sheet of claim 38 wherein the mica is a flake having an aspect ratio is about 30 to 300 at a particle size of about 50 to about 500 microns.

40. The sheet of claim 39 wherein the mica flake aspect ratio is about 80 to 120 at a particle size of about 50 to 500 microns.

41. The plate of claim 12 having a caliper coefficient of variation in a flange of less than 5.

42. The plate of claim 12 having a Parker Roughness of at least about 10 microns.

43. The plate of claim 42 having a caliper coefficient of variation in a flange of less than about 5.

44. The plate of claim 12 having a gloss surface below 30 gloss units on the side in contact with food.

45. The container of claim 1 in the form of a plate.

46. The plate of claim 12 having a caliper coefficient of variation in a sidewall of less than about 5.

47. The container of claim 1 wherein the mica weight of the container is about 20 to 30 weight percent and the talc content is about 20 to 10 weight percent.

48. A process for the manufacture of a microwaveable, food contact compatible, disposable, rigid container comprising extruding a sheet prepared by mixing essentially of an admixture of polypropylene, mica, talc, and a coupling agent functioning as a promoter of adherence between the polypropylene, mica and talc, and a pigment, thermoforming the admixture by application of vacuum into the shape of a container wherein the weight ratio of talc to the mica is controlled to achieve a micronodular surface on at least one side of the container, said container further exhibiting: a melting point of no less than about 250° F.; said container being dimensionally stable and resistant to grease, sugar, and water at temperatures up to about 220° F. and of sufficient toughness to be resistant to cutting by serrated polystyrene flatware.

49. The process of claim 48 wherein the polypropylene is a propylene-ethylene copolymer or blend and wherein the ethylene moiety in said copolymer or blend comprises less than 10 mole percent of said propylene-ethylene copolymer or blend.

50. The process of claim 49 wherein the polypropylene in the sheet is isotactic polypropylene homopolymer having a melt flow rate of about 0.1 to about 5.0.

51. The process of claim 48 wherein the coupling agent comprises a maleic anhydride modified polypropylene or acrylic modified polypropylene in a concentration of about 0.5 to about 3 weight percent based on the total weight of the container.

52. The process of claim 48 wherein the pigment is titanium dioxide.

53. The process of claim 48 wherein the pigment is carbon black.

54. The process of claim 48 wherein the container exhibits a melting point of about 250 to about 330° F.

55. The process of claim 48 wherein the polypropylene comprises about 40 to 90 percent by weight, the mica and talc together comprise about 7 to 59 percent by weight, and the pigment comprises about 0.5 to 3 percent by weight of said admixture wherein the weight ratio of talc to mica is in the range of about 10:30 to 30:10, respectively.

56. The process of claim 48 wherein said container is a plate.

57. The process of claim 56 for the manufacture of a plate having a diameter selected from 8.75 inches, 9.0 inches, 10.0 inches, 10.25 inches, and 11.0 inches.

58. The process of claim 48 wherein said container is a bowl.

59. The process of claim 48 wherein said container is a tray.

60. The process of claim 48 wherein said container is a cup.

61. The process of claim 48 wherein said container is a lid.

62. A process for the manufacture of the sheet of claim 37 comprising the step of mixing the polypropylene, coupling agent, mica, talc, and pigment, and converting the mixture at a temperature of about 450 to 480° F. into a sheet and recovering the sheet having a caliper in the range of about 5 to 50 mils.

63. A process for the manufacture of the container of claim 1 comprising the steps of (a) heat softening the sheet of claim 37 at a temperature of at least 260° F.; and (b) vacuum forming the sheet in a mold having a mold surface controlled to form a micronodular surface on the side of the container which is not in contact with the mold surface.

64. The process of claim 63 wherein the heat softening of the sheet is conducted at a temperature of at least 330° F.

65. A process for the manufacture of the plate of claim 12 comprising the steps of (a) heat softening the sheet of claim 37 at a temperature of at least 260° F.; (b) vacuum forming the sheet in a mold controlled to form a micronodular surface on the side of the plate which is in contact with the food to be heat treated or consumed.

66. A microwaveable, food contact compatible disposable, rigid container comprising an extruded sheet consisting essentially of an admixture of polypropylene, mica, talc, and a pigment, thermoformed by application of vacuum into the shape of a container wherein a loading level of mica and talc in the admixture is from about 7% to about 60% and the weight ratio of talc to the mica is controlled to achieve a micronodular surface on at least one side of the container, said container further exhibiting: a melting point of no less than about 250° F.; said container being dimensionally stable and resistant to grease, sugar, and water at temperatures up to about 220° F. and of sufficient toughness to be resistant to cutting by serrated polystyrene flatware.

67. A microwaveable, food contact compatible disposable, rigid container comprising an extruded sheet consisting essentially of an admixture of polypropylene, mica, and talc, thermoformed by application of vacuum into the shape of a container wherein a loading level of mica and talc in the admixture is from about 7% to about 60% and the weight ratio of talc to the mica is controlled to achieve a micronodular surface on at least one side of the container, said container further exhibiting: a melting point of no less than about 250° F.; said container being dimensionally stable and resistant to grease, sugar, and water at temperatures up to about 220° F. and of sufficient toughness to be resistant to cutting by serrated polystyrene flatware.

68. A microwaveable, food contact compatible disposable, rigid container comprising an extruded sheet consisting essentially of an admixture of polypropylene, mica, talc, and a coupling agent for promoting adherence between the polypropylene and the mica and talc, thermoformed by application of vacuum into the shape of a container wherein a loading level of mica and talc in the admixture is from about 7% to about 60% and the weight ratio of talc to the mica is controlled to achieve a micronodular surface on at least one side of the container, said container further exhibiting: a melting point of no less than about 250° F.; said container being dimensionally stable and resistant to grease, sugar, and water at temperatures up to about 220° F. and of sufficient toughness to be resistant to cutting by serrated polystyrene flatware.

69. The plate of claim 12 wherein the mica weight of the plate is about 20 to 30 weight percent and the talc content is about 20 to 10 weight percent.

70. A microwaveable, food contact compatible disposable, rigid container comprising an extruded sheet consisting essentially of an admixture of polypropylene, mica, talc, a coupling agent for promoting adherence between the polypropylene and the mica and talc, and a pigment, thermoformed by application of vacuum into the shape of a container wherein the weight ratio of talc to mica is from about 3:1 to about 1:3 and is controlled to achieve a micronodular surface on at least one side of the container, said container further exhibiting: a melting point of no less than about 250° F.; said container being dimensionally stable and resistant to grease, sugar, and water at temperatures up to about 220° F. and of sufficient toughness to be resistant to cutting by serrated polystyrene flatware.

71. A microwaveable, food contact compatible, disposable, rigid container comprising an extruded sheet consisting essentially of an admixture of polypropylene, mica, and talc, and a pigment, thermoformed by application of vacuum into the shape of a container wherein the weight ratio of talc to mica is from about 3:1 to about 1:3; said container further exhibiting:

(a) a melting point of no less than about 250° F.; and (b) a basis weight of at least 130 lbs. per 3000 square foot ream;

said container being dimensionally stable and resistant to grease, sugar, and water at temperatures up to about 220° F. and of sufficient toughness to be resistant to cutting by serrated polystyrene flatware.

72. A microwaveable, food contact compatible, disposable, rigid container comprising an extruded sheet consisting essentially of an admixture of polypropylene, mica, and talc, and a pigment, formed or thermoformed by application of vacuum into the shape of a container wherein the weight ratio of talc to mica is from about 3:1 to about 1:3 and the weight percent of the talc to the mica is controlled to achieve a micronodular surface on at least one side of the container, said container exhibiting:

(a) a basis weight of at least 130 lbs. per 3000 square foot ream; and (b) a melting point of no less than about 250° F.;

said container being dimensionally stable and resistant to grease, sugar, and water at temperatures up to about 220° F. and of sufficient toughness to be resistant to cutting by serrated polystyrene flatware.

73. A microwaveable, food contact compatible disposable, rigid container comprising an extruded sheet consisting essentially of an admixture of polypropylene, mica, talc, and a pigment, thermoformed by application of vacuum into the shape of a container wherein the weight ratio of talc to mica is from about 3:1 to about 1:3 and is controlled to achieve a micronodular surface on at least one side of the container, said container further exhibiting: a melting point of no less than about 250° F.; said container being dimensionally stable and resistant to grease, sugar, and water at temperatures up to about 220° F. and of sufficient toughness to be resistant to cutting by serrated polystyrene flatware.

74. A microwaveable, food contact compatible disposable, rigid container comprising an extruded sheet consisting essentially of an admixture of polypropylene, mica, and talc, thermoformed by application of vacuum into the shape of a container wherein the weight ratio of talc to mica is from about 3:1 to about 1:3 and is controlled to achieve a micronodular surface on at least one side of the container, said container further exhibiting: a melting point of no less than about 250° F.; said container being dimensionally stable and resistant to grease, sugar, and water at temperatures up to about 220° F. and of sufficient toughness to be resistant to cutting by serrated polystyrene flatware.

75. A microwaveable, food contact compatible disposable, rigid container comprising an extruded sheet consisting essentially of an admixture of polypropylene, mica, talc, and a coupling agent for promoting adherence between the polypropylene and the mica and talc, thermoformed by application of vacuum into the shape of a container wherein the weight ratio of talc to mica is from about 3:1 and about 1:3 and is controlled to achieve a micronodular surface on at least one side of the container, said container further exhibiting: a melting point of no less than about 250° F.; said container being dimensionally stable and resistant to grease, sugar, and water at temperatures up to about 220° F. and of sufficient toughness to be resistant to cutting by serrated polystyrene flatware.

* * * * *

UNITED STATES PATENT AND TRADEMARK OFFICE
CERTIFICATE OF CORRECTION

PATENT NO. : 6,100,512
DATED : August 8, 2000
INVENTOR(S) : Neculescu et al.

It is certified that error appears in the above-identified patent and that said Letters Patent is hereby corrected as shown below:

Claim 12, Column 22,
Line 14, delete "and strong."

Signed and Sealed this

Twenty-fifth Day of September, 2001

Attest:

*Attesting Officer*

NICHOLAS P. GODICI
*Acting Director of the United States Patent and Trademark Office*